United States Patent
Wang et al.

(10) Patent No.: US 9,325,788 B2
(45) Date of Patent: Apr. 26, 2016

(54) METHOD, DEVICE AND SYSTEM FOR PROCESSING A NETWORK MAPPING IDENTIFIER, AND PEER SELECTION METHOD

(75) Inventors: Yan Wang, Shenzhen (CN); Guoyi Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1143 days.

(21) Appl. No.: 13/347,882

(22) Filed: Jan. 11, 2012

(65) Prior Publication Data

US 2012/0110089 A1 May 3, 2012

Related U.S. Application Data

(63) Continuation of application No. PCT/CN2009/072912, filed on Jul. 24, 2009.

(51) Int. Cl.
- G06F 15/16 (2006.01)
- H04L 29/08 (2006.01)
- H04L 12/701 (2013.01)
- H04L 12/751 (2013.01)
- H04L 29/12 (2006.01)

(52) U.S. Cl.
CPC .............. *H04L 67/104* (2013.01); *H04L 45/00* (2013.01); *H04L 45/02* (2013.01); *H04L 29/1232* (2013.01)

(58) Field of Classification Search
CPC ... H04L 29/1232; H04L 67/104; H04L 45/00; H04L 45/02
See application file for complete search history.

(56) References Cited

U.S. PATENT DOCUMENTS

| | | | | |
|---|---|---|---|---|
| 8,095,677 | B1 * | 1/2012 | Kucherawy | 709/230 |
| 2006/0126611 | A1 * | 6/2006 | Kelly et al. | 370/389 |
| 2007/0064702 | A1 | 3/2007 | Bates et al. | |

FOREIGN PATENT DOCUMENTS

| | | |
|---|---|---|
| CN | 1968164 A | 5/2007 |
| CN | 1988449 A | 6/2007 |
| CN | 101018172 A | 8/2007 |
| CN | 101094244 A | 12/2007 |

(Continued)

OTHER PUBLICATIONS

Duerig et al., "Optimizing IP Address Assignment on Network Topologies", Pub. Date: 2006, pp. 1-12.*
Jagadish et al., "Baton: A Balanced Tree Structure for Peer-to-Peer Network", Pub. Date: 2005, pp. 1-9.*
Extended European Search Report dated Jun. 1, 2012 in connection with European Patent Application No. 09847476.0, 7 pages.

(Continued)

*Primary Examiner* — Krista Zele
*Assistant Examiner* — James Forman

(57) ABSTRACT

A method, a device and a system for processing a network mapping identifier, and a peer selection method are provided, in which the method includes: obtaining topology information of a network, in which the topology information includes a relation between nodes in the network; generating a network mapping identifier capable of indicating a relation between a peer and other peers in the network according to the topology information; and combining the generated network mapping identifier and an Internet Service Provider (ISP) identifier into a network mapping identifier, and allocating the network mapping identifier to the peer. Through the method, the device and the system, the network topology information of an ISP is protected from being exposed, a load on the ISP is reduced, and private information of a peer-to-peer (p2p) application system is capable of being protected.

3 Claims, 11 Drawing Sheets

(56) References Cited

FOREIGN PATENT DOCUMENTS

| CN | 101309301 A | 11/2008 |
|---|---|---|
| WO | WO 2007/093742 A2 | 8/2007 |

OTHER PUBLICATIONS

Written Opinion of International Searching Authority dated Apr. 19, 2010 in connection with International Patent Application No. PCT/CN2009/072912, 4 pages.

Cheng, et al.; "Internet Topology Based Identifier Assignment for Tree-Based DHTS" New Techologies, Mobility and Security, Chapter 50, XP-002510201; Jan. 1, 2007, retrieved from Internet: http://www.springerlink.com pp. 607-616.

International Search Report dated Apr. 29, 2010 in connection with International Patent Application No. PCT/CN2009/072912.

Partial translation of Office Action dated May 3, 2013 in connection with Chinese Patent Application No. 200980159090.6.

Jiang Min, et al., "Reasearch of Data Mapping Inference Algorism of Peer-To-Peer", Computer Engineering and Applications, Issue 3, 2009, p. 152-157.

* cited by examiner

METHOD, DEVICE AND SYSTEM FOR PROCESSING A NETWORK MAPPING IDENTIFIER, AND PEER SELECTION METHOD

CROSS-REFERENCE TO RELATED APPLICATIONS

This application is a continuation of International Application No. PCT/CN2009/072912, filed on Jul. 24, 2009, which is hereby incorporated by reference in its entirety.

TECHNICAL FIELD

The present invention relates to peer to peer (p2p) technologies, and in particular, to a method, a device and a system for processing a network mapping identifier, and a peer selection method.

BACKGROUND

At present, with the development of network technologies, people have growing demands on large-volume information (for example, music or video files). The p2p technologies break a conventional client/server (C/S) structure, and p2 p computation is used to randomly select peers, so that data transmission performance is improved, and the cost of the server is also dramatically reduced. However, inmost cases, an optimal peer sequence cannot be found for the peers, thereby causing the deterioration of the data transmission performance or excessive cross-domain traffic. Therefore, optimization of the p2p traffic becomes a central issue in the current p2p technologies.

No matter whether it is a structured p2p or an unstructured p2p, since the peers are randomly selected, a great difference between a logical coverage network and an actual physical bearer network is caused in p2p application. Adjacent nodes in the logical network may span multiple Autonomous System (AS) nodes in an actual route in the physical network, and even span networks of multiple Internet Service Providers (ISPs). In essence, the difference is caused by the reason that network entities in the p2p application fail to know information of lower layer network.

In order to optimize the p2p traffic and to overcome waste of the p2p traffic caused by the random selection of the peers, a method is provided in the prior art, in which a p2p application system performs peer selection according to information of a network provided by an ISP, thereby optimizing the p2p traffic. For example, when a client peer starts a p2p procedure, the client peer requests a peer list from a p2p traffic optimization server, and then the p2p traffic optimization server obtains network topology information of an ISP and returns a preferred peer list to the client peer according to the network topology information of the ISP. The method has the following problems: (1) The ISP needs to provide the network topology information, which easily causes exposure of the ISP network topology information; and (2) a large number of peers request the peer list from the p2p traffic optimization server, which may increase the load on the ISP.

Another method is further provided in the prior art, in which the p2p application system sends a source peer and a destination peer to the p2p traffic optimization server of the ISP, and then the p2p traffic optimization server performs peer selection for the p2p application system according to the network topology information. Such a method has the following problem: the request message from the p2p application system to the p2p traffic optimization server may expose private information of the p2p application system.

SUMMARY

Embodiments of the present invention provide a method, a device and a system for processing a network mapping identifier, and a peer selection method, which can prevent ISP network topology information and private information of a p2p application system from being exposed, and can reduce the load on the ISP.

An embodiment of the present invention provides a method for processing a network mapping identifier, where the method includes:

obtaining topology information of a network, in which the topology information includes a relation between nodes in the network;

generating a network mapping identifier capable of indicating a relation between a peer and other peers in the network according to the topology information; and allocating the generated network mapping identifier to the peer.

An embodiment of the present invention further provides a peer selection method using a network mapping identifier, where the method includes:

obtaining a network mapping identifier of a peer, in which the network mapping identifier is capable of indicating a relation between the peer and other peers in the network; and selecting a target peer for performing data transmission with the peer according to the network mapping identifier.

An embodiment of the present invention provides a device for processing a network mapping identifier, where the device includes:

a first obtaining module, configured to obtain topology information of a network, in which the topology information includes a relation between nodes in the network;

an identifier generation module, configured to generate a network mapping identifier capable of indicating a relation between a peer and other peers in the network according to the topology information obtained by the first obtaining module; and an allocation module, configured to allocate the generated network mapping identifier to the peer.

An embodiment of the present invention further provides a device for processing a network mapping identifier, where the device includes:

a second obtaining module, configured to obtain a network mapping identifier of a peer, in which the network mapping identifier is capable of indicating a relation between the peer and other peers in the network; and a processing module, configured to select a target peer for performing data transmission with the peer according to the network mapping identifier.

An embodiment of the present invention further provides a system for processing a network mapping identifier, where the system includes the foregoing two devices for processing a network mapping identifier, in which the allocation module is connected to the second obtaining module.

In the embodiments of the present invention, the network mapping identifier capable of indicating a relation between the peer and other peers can be generated through a p2p traffic optimization server according to the topology information of the network in combination with a policy of the ISP, the generated network mapping identifier is allocated to each peer, so that the peer can use the network mapping identifier to select the target peer for data transmission, and it is not required that the ISP provides the topology information of the network as in the prior art, which can protect the network topology information of the ISP from being exposed, and reduce the load on the ISP since the number of times the p2p traffic optimization server is requested is reduced. The p2p application system does not need to send the source peer and the destination peer to the p2p traffic optimization server, so the private information of the p2p application system can be protected.

BRIEF DESCRIPTION OF THE DRAWINGS

FIG. 8 is a schematic diagram of a subtree of POP nodes under an AS1 node generated on the basis of the binary tree shown in FIG. 3a;

FIG. 9 is a schematic diagram of a subtree of POP nodes generated under an AS node in the binary tree shown in FIG. 3a;

DETAILED DESCRIPTION

In a method for processing a network mapping identifier provided by the present invention, a network mapping identifier capable of indicating a relation between a peer and other peers in the network is generated according to the topology information of the network, in which the network mapping identifier may be some binary codes, multidimensional vectors, multidimensional space coordinates or other numeric combinations, and the peer can obtain an optimal data transmission object by performing computation on the network mapping identifier when selecting the data transmission object, but topology information of a network maintained by an ISP cannot be derived according to the network mapping identifier, so that the topology information of the network maintained by the ISP cannot be exposed, and private information of a p2p application system can be protected.

Figure 1:
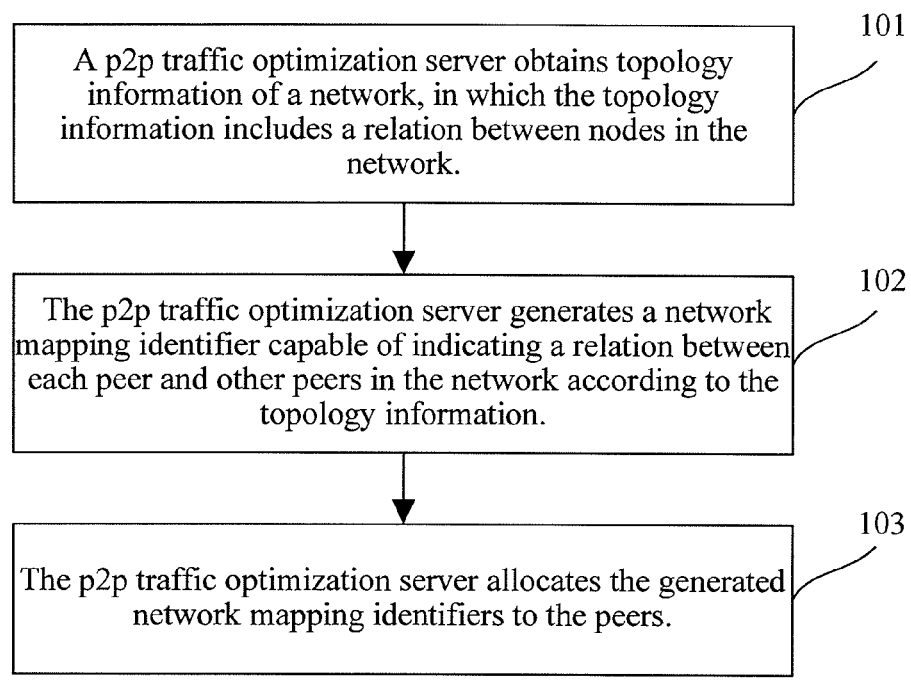
FIG. 1 is a flow chart of Embodiment 1 of processing a network mapping identifier according to the present invention.

FIG. 1 is a flow chart of Embodiment 1 of a method for processing a network mapping identifier according to the present invention, where the method includes the following steps.

Step 101: A p2p traffic optimization server obtains topology information of a network, in which the topology information includes a relation between nodes in the network.

Step 102: The p2p traffic optimization server generates a network mapping identifiers capable of indicating a relation between each peer and other peers in the network according to the topology information.

Step 103: The p2p traffic optimization server allocates the generated network mapping identifiers to the peers.

In step 101, the relation between the peers in the network may specifically be a weight value between the nodes, in which the weight value may be multiple measurements, for example, a bandwidth, a cost, or may be a weighted sum of the multiple measurements.

The p2p traffic optimization server is a network entity maintained by the ISP in the network. When the peer in the network is started, first the peer may send a registration request to a p2p server maintained by the ISP of the peer, and then the p2p traffic optimization server allocates a network mapping identifier to the peer. Afterwards, the peer may select a target peer for data transmission by performing computation on the network mapping identifier. Generally, when data transmission is performed between two peers, the peers may generally select other peers with the lowest data transmission cost as the target peer. Alternatively, the target peer may be selected according to other policies, for example, in order to protect robustness of the system, the peers with a small data transmission cost may be selected as most of the target peers, and the peers with a large data transmission cost may be selected as a small part of the target nodes, or the small part of the target nodes is randomly selected. Assumed that the number of target peers is 10, 8 peers with a small data transmission cost may be selected, and 2 peers with a large data transmission cost may be selected. Whether the data transmission cost is large or small may be determined according to an actual condition of the network.

In the prior art, a network mapping identifier allocated by the ISP to a peer cannot indicate a relation between the peer and other peers in the network, so the peer cannot select a data transmission object by performing computation on the network mapping identifier when selecting a target peer. In the method for processing the network mapping identifier provided by the embodiment shown in FIG. 1 according to the present invention, the network mapping identifier capable of indicating the relation between the peer and other peers is generated through the p2p traffic optimization server according to the topology information of the network, so that the peer can select the target peer for data transmission by using the network mapping identifier, and it is not required to directly provide the network topology information of the ISP as in the prior art, which can protect the network topology information of the ISP from being exposed, and decrease a load on the ISP since the number of times the p2p traffic server is requested is reduced. Since a p2p application system does not need to send a source peer and a destination peer to the p2p traffic optimization server, private information of the p2p application system can be protected.

The nodes in the p2p network may be divided into many kinds according to the coverage, which include AS nodes, POP nodes and peers, and may also include ISP nodes. In the p2p network, the peer is a node with smallest coverage, and the AS node and the POP nodes both include a plurality of peers. The nodes in the p2p network may further be classified according to peer-to-peer properties, for example, peers with the same property are classified into a kind. In the p2p network, an ISP policy may be embodied by adjusting a weight value. For example, the ISP may set that the greater the weight value between two nodes is, the shorter the distance between the two nodes is; or the ISP may set that the smaller the weight value between two nodes is, the longer the distance between the two nodes is. The ISP may also adjust some weight values at any moment, so as to affect the selection of the target peer for data transmission by the peer.

In Embodiment 1 of the present invention, the generating the network mapping identifier capable of indicating a relation between each peer and other peers in the network according to the topology information may include: generating a peer identifier capable of indicating a relation between each peer and other peers in the network according to the topology information, and using the peer identifier as the network mapping identifier. Alternatively, the generating the network mapping identifier capable of indicating a relation between each peer and other peers in the network according to the topology information may include: generating a peer identifier capable of indicating a relation between each peer and other peers in the network according to the topology information; generating an ISP identifier for indicating a relation between an ISP and other ISPs in the network; and combining the ISP identifier and the peer identifier into the network mapping identifier.

The ISP identifier is an identifier of an ISP of the peer, which may be in various forms, such as a number, a string or an identifier allocated according to the ISP policy. The peer identifier may be obtained by generating a binary tree, or through a multidimensional vector, or through other methods such as a multidimensional space coordinate method.

Step 102 in Embodiment 1 may specifically include: generating a binary tree according to relations between nodes in the topology information, marking a left edge between any two sibling nodes in the binary tree with 1, marking a right edge between any two sibling nodes with 0, and forming a binary code with binary numbers, 0s and 1s, from a treetop to each leaf node of the binary tree to generate a peer identifier of a node corresponding to the leaf node.

Alternatively, a binary tree is generated according to relations between nodes in the topology information, a left edge between any two sibling nodes in the binary tree is marked with 0, a right edge between any two sibling nodes is marked with 1, and binary numbers, 0s and 1s, from a treetop to each leaf node of the binary tree form a binary code to generate a peer identifier of a node corresponding to the leaf node.

The node may be an AS node, a POP node or a peer. When the nodes are the AS nodes, the allocating the generated network mapping identifiers to the peers specifically includes: allocating the generated network mapping identifier of the AS node corresponding to each leaf node to each peer included in the AS node.

When the nodes are the POP nodes, the allocating the generated network mapping identifiers to the peers specifically includes: allocating the generated network mapping identifier of the POP nodes corresponding to each leaf node to each peer connected to the POP nodes.

The generating the binary tree according to relations between the nodes in the topology information may specifically include the following steps.

Weight values between first nodes in the network are obtained to form a first set according to the topology information.

A smallest weight value is selected from the first set, two first nodes A1 and B1 corresponding to the smallest weight value are used as child nodes to establish a parent node C1 of A1 and B1, the smallest weight value is deleted from the first set, and a weight value between the parent node C1 and each of other first nodes i1 is used to replace a weight value between A1 and the first node it and a weight value between B1 and the first node it in the first set, in which the weight value between the parent node C1 and the first node i1 is a greater one of the weight value between A1 and the first node i1 and the weight value between B1 and the first node i1, and the other first nodes i1 are other first nodes in the network except the first nodes A1 and B1.

A smallest weight value is continuously selected from the first set till only one weight value is left in the first set, two first nodes An1 and Bn1 corresponding to the left weight value are used as child nodes to establish a parent node Cn1 of An1 and Bn1, in which the parent node Cn1 is a root node of the generated binary tree.

The way of generating the peer identifier is described in the following with reference to a specific network structure.

Figure 2:
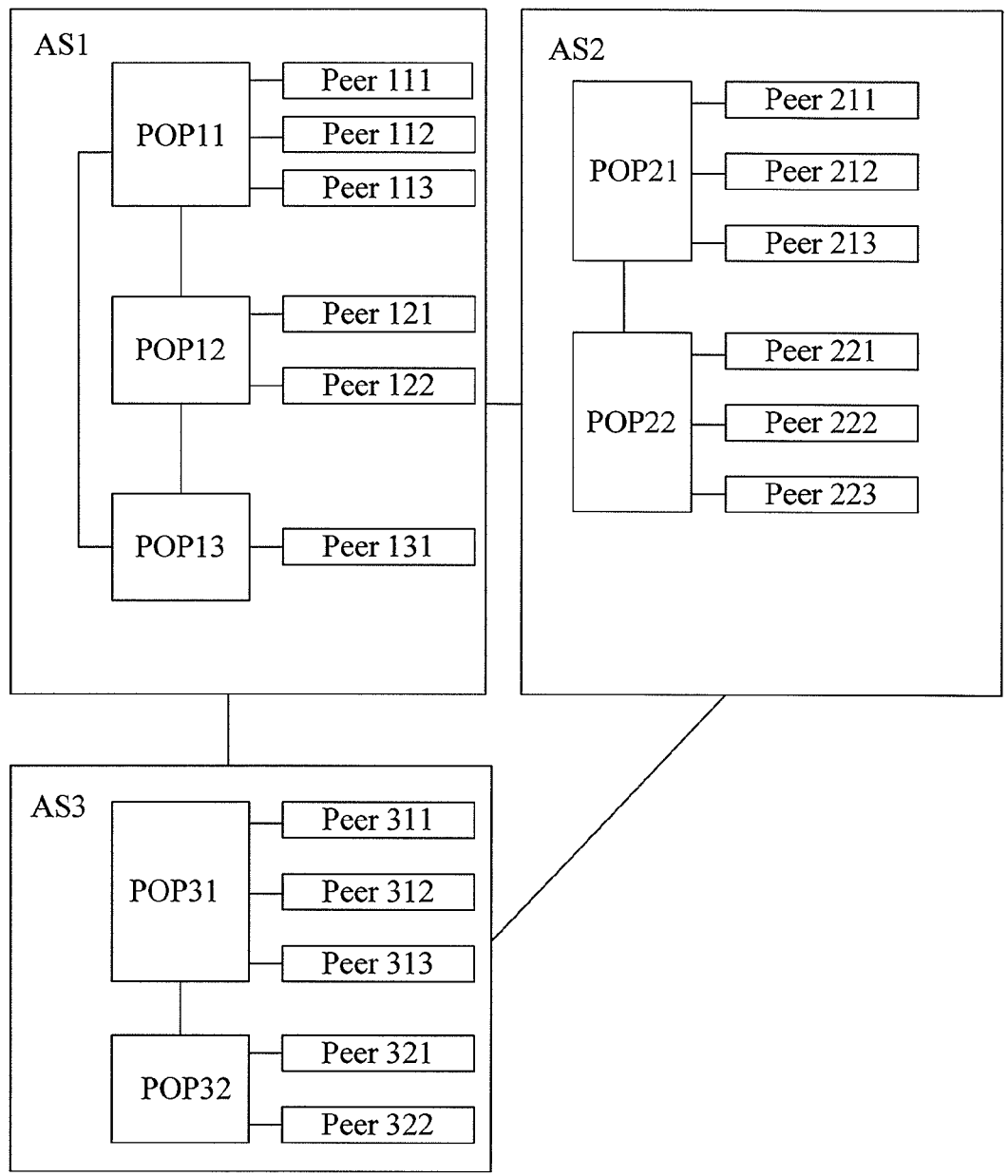
FIG. 2 illustrates a relevant network topology structure according to an embodiment of the present invention.

FIG. 2 illustrates a relevant network topology structure according to an embodiment of the present invention. The structure is a network managed by an ISP, and the network includes three ASs: AS1, AS2 and AS3. AS1 includes three POPs, which are respectively POP11, POP12 and POP13. POP11 is connected to a peer 111, a peer 112 and a peer 113 respectively, POP12 is connected to a peer 121 and a peer 122 respectively, and POP13 is connected to a peer 131. AS2 includes two POPs, which are respectively POP21 and POP22. POP21 is connected to a peer 211, a peer 212 and a peer 213 respectively, POP22 is connected to a peer 221 a peer 222 and a peer 223 respectively. AS3 includes two POPs, which are respectively POP31 and POP32. POP31 is connected to a peer 311, a peer 312 and a peer 313 respectively, and POP32 is connected to a peer 321 and a peer 322 respectively.

For the network structure shown in FIG. 2, a peer identifier may be generated through the following binary tree generation methods.

(1) AS-Level Peer Identifiers are Generated.

The network topology structure shown in FIG. 2 includes three AS nodes, and a peer identifier may be generated for each of the three AS nodes respectively, which is used as peer identifiers of the peers in the AS node, and the peer identifier generated for the AS node is called an AS-level peer identifier.

A process of generating the AS-level identifier is as follows.

Weight values between the AS nodes are obtained according to the obtained topology information of the network, and form a first set M. Table 1 shows the first set M formed by the weight values between the AS nodes in FIG. 2. Table 1 is an example, and according to a specific structure of the network topology, the first set M may not be limited to what is shown by Table 1.

TABLE 1

First set M formed by the weight values between the AS nodes in FIG. 2

| Node | Node | Weight value |
|---|---|---|
| AS1 | AS2 | 1 |
| AS1 | AS3 | 2 |
| AS3 | AS2 | 3 |

In Table 1, the weight value between AS1 and AS2 is 1, the weight value between AS1 and AS3 is 2, and the weight value between AS2 and AS3 is 3.

The two AS nodes, AS1 and AS2, corresponding to the smallest weight value in the first set M are used as child nodes to establish a parent node AS12 of AS1 and AS2, a weight value between the child nodes AS1 and AS3 and a weight value between the child nodes AS2 and AS3 are replaced by using the parent node AS12, and a greater one of the weight value between the child nodes AS2 and AS3 and the weight value between the child nodes AS1 and AS3 is used as a weight value between the parent node AS12 and AS3. After the weight value between AS1 and AS2 is deleted and the weight values between the child nodes AS1 and AS3 and between the child nodes AS2 and AS3 are replaced by using the parent node AS12, the first set M is shown in Table 2.

TABLE 2

First set M after the weight value of a link between AS1 and AS2 is deleted and the weight values between the child nodes AS1 and AS3 and between the child nodes AS2 and AS3 are replaced by the parent node AS12

| Node | Node | Weight value |
|---|---|---|
| AS12 | AS3 | 3 |

Figure 3A:
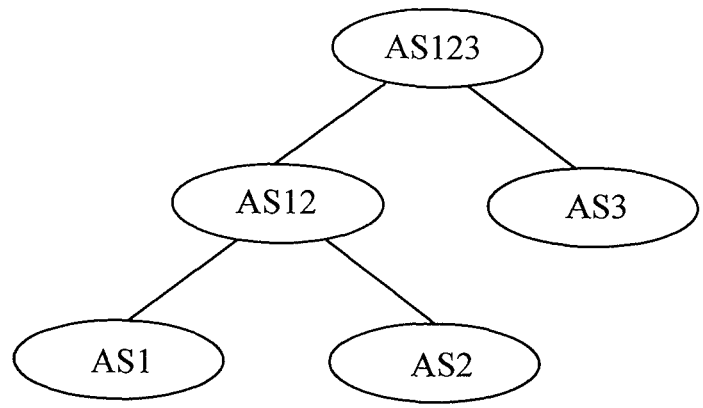
FIG. 3a illustrates a binary tree of the network topology structure shown in FIG. 2.

The nodes corresponding to the smallest weight value in the first set M, that is the nodes AS12 and AS3, are used as the child nodes to establish a parent node AS123 of AS12 and AS3. FIG. 3a illustrates a binary tree of the network topology structure shown in FIG. 2. In FIG. 3a, AS123 is a root node, and AS1, AS2 and AS3 are leaf nodes without descendant nodes.

Figure 3B:
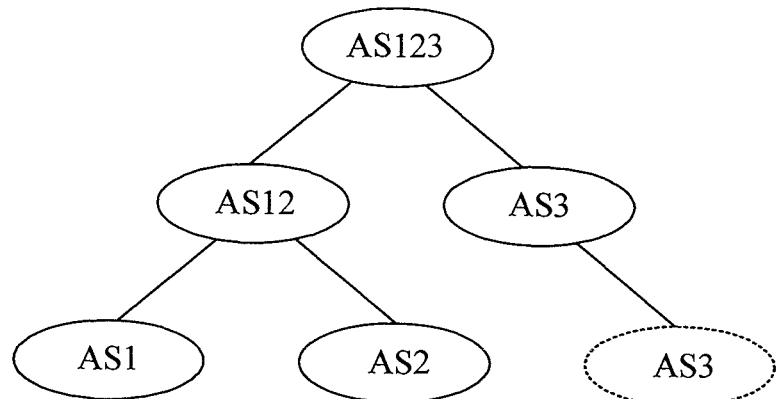
FIG. 3b illustrates another binary tree of the network topology structure shown in FIG. 2.
Figure 4:
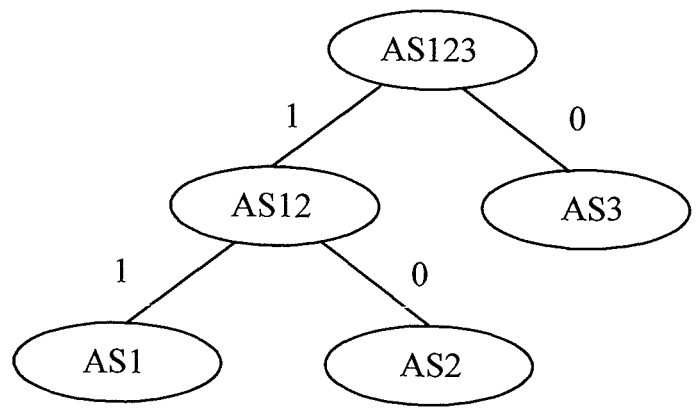
FIG. 4 is a schematic diagram of a binary tree after a left edge and a right edge between any two sibling nodes in the binary tree shown in FIG. 3a are respectively marked with 0 and 1.

Then, a left edge between any two sibling nodes in the generated binary tree is marked with 1, and a right edge between any two sibling nodes is marker with 0. FIG. 4 is a schematic diagram of a binary tree after a left edge and a right edge between any two sibling nodes in the binary tree shown in FIG. 3a are respectively marked with 0 and 1. As shown in FIG. 4, a combination of binary numbers, 0s and 1s, corresponding to edges from a treetop to each leaf node of the binary tree is the peer identifier of the AS node corresponding to the leaf node, and the peer identifier is a peer identifier of each peer in the AS node. For example, as for AS1, the combination of the binary numbers corresponding to edges from the treetop AS123 to AS1 is 11, and the peer identifier of AS1 is 11; as for AS2, the combination of the binary numbers corresponding to edges from the treetop AS123 to AS2 is 10, and the peer identifier of AS2 is 10; and as for AS3, the combination of the binary numbers corresponding to edges from the treetop AS123 to AS2 is 0, and the peer identifier of AS3 is 0. It can be seen that, in the binary tree shown in FIG. 4, AS3 is not on the same layer as AS1 and AS2, so a length of the peer identifier of AS3 is not the same as lengths of the peer identifiers of AS1 and AS2, thereby not facilitating the computation during subsequent target peer selection. In order to solve such a problem, 0 or 1 may be filled into the peer identifier of AS3 till the length of the peer identifier of AS3 is the same as that of AS1 and AS2. For example, the peer identifier of AS3 may be 00, 01 or 10. Alternatively, all the leaf nodes in the binary tree shown in FIG. 4 may also be filled and prolonged to the same layer. FIG. 3b illustrates another binary tree of the network topology structure shown in FIG. 2. In FIG. 3b, the leaf node corresponding to AS3 is prolonged, and in this way AS3 is on the same layer as AS1 and AS2. The peer identifier of AS3 is 00.

As for the binary trees shown in FIG. 3a and FIG. 3b, alternatively the left edge between any two sibling nodes may be marked with 0, the right edge between any two sibling nodes may be marker with 1, and the combination of the binary numbers, 0s and 1s, corresponding to the edges from the treetop to each leaf node of the binary tree is used as the peer identifier of the AS corresponding to the leaf node.

After the peer identifiers of AS1, AS2 and AS3 are obtained, the peer identifiers of peers in AS1, AS2 and AS3 are the peer identifier of the AS of the peers.

(2) POP-level peer identifiers are generated.

In the Network Topology Structure Shown in FIG. 2, seven Pops are included, which respectively are POP11, POP12, POP13, POP21, POP22, POP31 and POP32, and one peer identifier may be generated for each of the seven POPs respectively and may be used as peer identifiers of peers in each POP.

The weight values between the POP nodes are obtained according to the obtained topology information of the network, and form a first set N. Table 3 illustrates the first set N formed by the weight values between the POPs in FIG. 2.

TABLE 3

First set N formed by the weight values between the POPs in FIG. 2

| Node | Node | Weight value |
|---|---|---|
| POP11 | POP12 | 2 |
| POP11 | POP13 | 2 |
| POP11 | POP21 | 3 |
| POP11 | POP22 | 4 |
| POP11 | POP31 | 6 |
| POP11 | POP32 | 7 |
| POP12 | POP13 | 1 |
| POP12 | POP21 | 4 |
| POP12 | POP22 | 5 |
| POP12 | POP31 | 7 |
| POP12 | POP32 | 8 |
| POP13 | POP21 | 4 |
| POP13 | POP22 | 5 |
| POP13 | POP31 | 6 |
| POP13 | POP32 | 9 |
| POP21 | POP22 | 2 |
| POP21 | POP31 | 10 |
| POP21 | POP32 | 11 |
| POP22 | POP31 | 12 |
| POP22 | POP32 | 11 |
| POP31 | POP32 | 1 |

The two POP nodes, POP12 and POP13, corresponding to a smallest weight value in the first set N shown in Table 3 are selected as child nodes to establish a parent node POP1213 of POP12 and POP13, the weight value between POP12 and POP13 in a second set is deleted, a weight value between the child node POP12 and other POP nodes, and a weight value between the child node POP13 and other POP nodes are replaced by a weight value between the parent node POP1213 and other POP nodes, and a greater one of the weight value between the child node POP12 and other POP nodes, and the weight value between the child node POP13 and other POP nodes is used as the weight value between the parent node POP1213 and other POP nodes. After the weight value between POP12 and POP13 in the second set is deleted, and the weight value between the child node POP12 and other POP nodes, and the weight value between the child node POP13 and other POP nodes are replaced by the weight value between the parent node POP1213 and other POP nodes, the first set N is as shown in Table 4.

TABLE 4

First set N after the weight value between POP12 and POP13 in the first set N is deleted, and the weight value between the child node POP12 and other POP nodes, and the weight value between the child node POP13 and other POP nodes are replaced by the weight value between the parent node POP1213 and other POP nodes

| Node | Node | Weight value |
|---|---|---|
| POP11 | POP1213 | 2 |
| POP11 | POP21 | 3 |
| POP11 | POP22 | 4 |
| POP11 | POP31 | 6 |
| POP11 | POP32 | 7 |
| POP1213 | POP21 | 4 |
| POP1213 | POP22 | 5 |
| POP1213 | POP31 | 7 |
| POP1213 | POP32 | 9 |
| POP21 | POP22 | 2 |
| POP21 | POP31 | 10 |
| POP21 | POP32 | 11 |
| POP22 | POP31 | 12 |
| POP22 | POP32 | 11 |
| POP31 | POP32 | 1 |

The above steps are repeated. Two POP nodes, that is, POP31 and POP32, corresponding to a smallest weight value in the first set N shown in Table 4 are then selected to establish a parent node POP3132 of POP31 and POP32, the weight value between POP31 and POP32 in the first set N is deleted, a weight value between the child node POP31 and other POP nodes, and a weight value between the child node POP32 and other POP nodes are replaced by a weight value between the parent node POP3132 and other POP nodes, and a greater one of the weight value of a link between the child node POP31 and other POP nodes, and a weight value of a link between the child node POP32 and other POP nodes is used as a weight value of a link between the parent node POP3132 and other POP nodes. After the weight value between POP31 and POP32 in the first set N is deleted, and the weight value between the child node POP31 and other POP nodes, and the weight value between the child node POP32 and other POP nodes are replaced by the weight value between the parent node POP3132 and other POP nodes, the first set N is shown in Table 5.

TABLE 5

First set N after the weight value between POP31 and POP32 in the first set N is deleted, and the weight value between the child node POP31 and other POP nodes, and the weight value between the child node POP32 and other POP nodes are replaced by the weight value between the parent node POP3132 and other POP nodes

| Node | Node | Weight value |
|---|---|---|
| POP11 | POP1213 | 2 |
| POP11 | POP21 | 3 |
| POP11 | POP22 | 4 |
| POP11 | POP3132 | 7 |
| POP1213 | POP21 | 4 |
| POP1213 | POP22 | 5 |
| POP1213 | POP3132 | 9 |
| POP21 | POP22 | 2 |

TABLE 5-continued

First set N after the weight value between POP31 and POP32 in the first set N is deleted, and the weight value between the child node POP31 and other POP nodes, and the weight value between the child node POP32 and other POP nodes are replaced by the weight value between the parent node POP3132 and other POP nodes

| Node | Node | Weight value |
|---|---|---|
| POP21 | POP3132 | 11 |
| POP22 | POP3132 | 12 |

The above steps are repeated. Two POP nodes, that is, POP11 and POP1213, corresponding to a smallest weight value in the first set N shown in Table 5 are then selected to establish a parent node POP111213 of POP11 and POP1213, the weight value between POP11 and POP1213 in the first set N is deleted, a weight value between the child node POP11 and other POP nodes, and a weight value between the child node POP1213 and other POP nodes are replaced by a weight value between the parent node POP111213 and other POP nodes, and a greater one of a weight value of a link between the child node POP11 and other POP nodes, and a weight value of a link between the child node POP1213 and other POP nodes is used as a weight value of a link between the parent node POP111213 and other POP nodes. After the weight value between POP11 and POP1213 in the first set N is deleted, and the weight value between the child node POP11 and other POP nodes, and the weight value between the child node POP1213 and other POP nodes are replaced by the weight value between the parent node POP111213 and other POP nodes, the first set N is shown in Table 6.

TABLE 6

First set N after the weight value between POP11 and POP1213 in the first set N is deleted, and the weight value between the child node POP11 and other POP nodes, and the weight value between the child node POP1213 and other POP nodes are replaced by the weight value between the parent node POP111213 and other POP nodes

| Node | Node | Weight value |
|---|---|---|
| POP111213 | POP21 | 4 |
| POP111213 | POP22 | 5 |
| POP111213 | POP3132 | 9 |
| POP21 | POP22 | 2 |
| POP21 | POP3132 | 11 |
| POP22 | POP3132 | 12 |

The above steps are repeated. Two POP nodes, that is, POP21 and POP22, corresponding to a smallest weight value in the first set N shown in Table 6 are then selected to establish a parent node POP2122 of POP21 and POP22, the weight value between POP21 and POP22 in the first set N is deleted, a weight value between the child node POP21 and each of other POP nodes, and a weight value between the child node POP22 and other POP nodes are replaced by a weight value between the parent node POP2122 and other POP nodes, and a greater one of a weight value between the child node POP21 and other POP nodes, and a weight value between the child node POP22 and other POP nodes is used as a weight value between the parent node POP2122 and other POP nodes. After the weight value between POP21 and POP22 in the first set N is deleted, and the weight value between the child node POP21 and each of other POP nodes, and the weight value between the child node POP22 and other POP nodes are replaced by the weight value between the parent node POP2122 and other POP nodes, the first set N is shown in Table 7.

TABLE 7

First set N after the weight value between POP21 and POP22 in the first set N is deleted, and the weight value between the child node POP21 and other POP nodes, and the weight value between the child node POP22 and other POP nodes are replaced by the weight value between the parent node POP2122 and other POP nodes

| Node | Node | Weight value |
|---|---|---|
| POP111213 | POP2122 | 5 |
| POP111213 | POP3132 | 9 |
| POP2122 | POP3132 | 12 |

The above steps are repeated. Two POP nodes, POP111213 and POP2122, corresponding to a smallest weight value in the first set N shown in Table 7 are then selected to establish a parent node POP2122111213 of POP2122 and POP111213, the weight value between POP2122 and POP111213 in the first set N is deleted, a weight value between the child node POP2122 and each of other POP nodes, and a weight value between the child node POP111213 and other POP nodes are replaced by a weight value between the parent node POP2122111213 and other POP nodes, and a greater one of the weight value between the child node POP2122 and each of other POP nodes, and a weight value between the child node POP111213 and other POP nodes is used as a weight value between the parent node POP2122111213 and other POP nodes. After the weight value between POP2122 and POP111213 in the first set N is deleted, and the weight value between the child node POP2122 and each of other POP nodes, and the weight value between the child node POP111213 and other POP nodes are replaced by the weight value between the parent node POP2122111213 and other POP nodes, the first set N is shown in Table 8.

TABLE 8

First set N after the weight value between POP2122 and POP111213 in the first set N is deleted, and the weight value between the child node POP2122 and other POP nodes, and the weight value between the child node POP111213 and other POP nodes are replaced by the weight value between the parent node POP2122111213 and other POP nodes

| Node | Node | Weight value |
|---|---|---|
| POP2122111213 | POP3132 | 12 |

Figure 5:
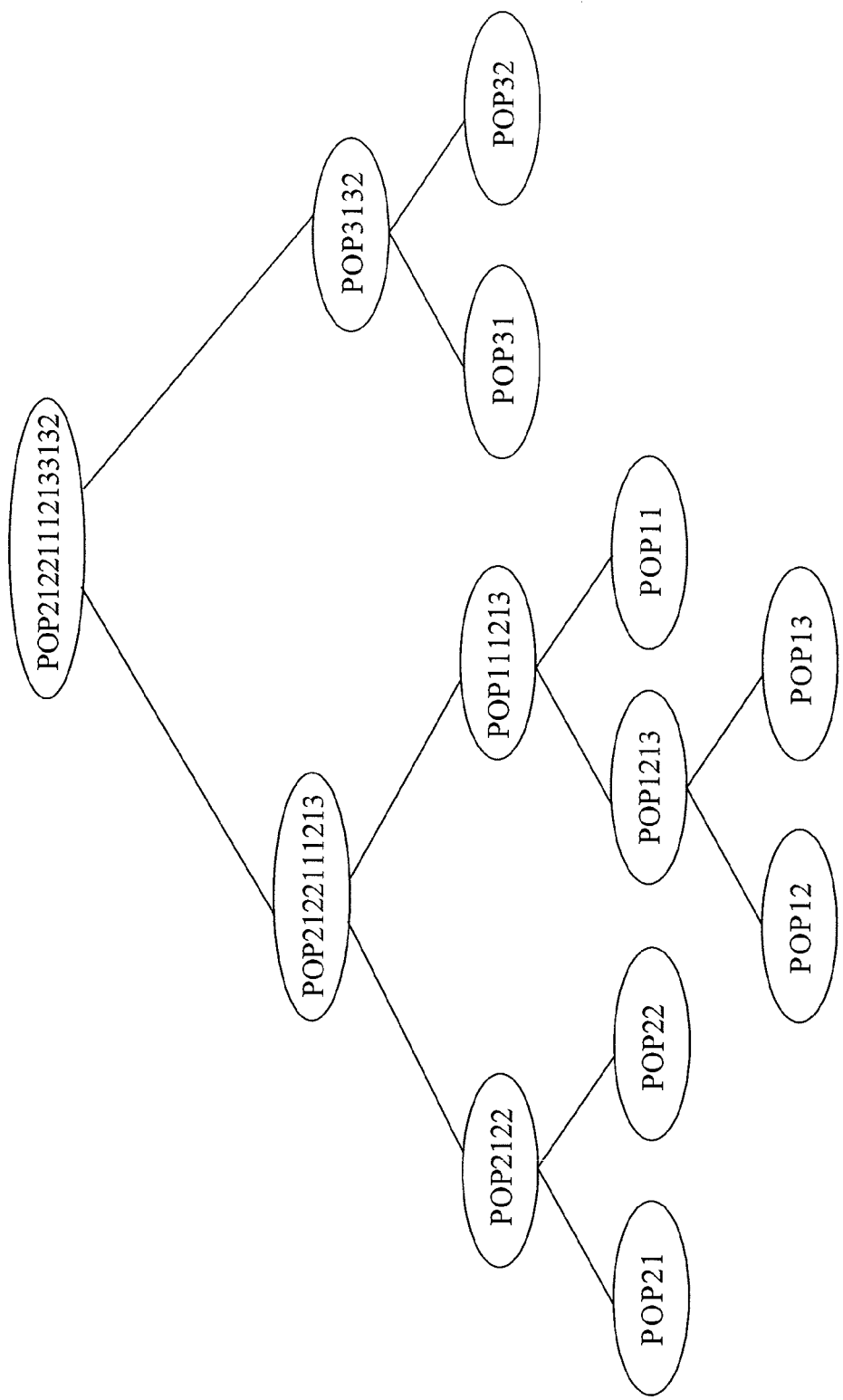
FIG. 5 illustrates still another binary tree of the network topology structure shown in FIG. 2.

Only one weight value is left in the first set N shown in Table 8, and in this case, a parent node POP21221112133132 of the two child nodes POP2122111213 and POP3132 corresponding to the weight value may be established. FIG. 5 illustrates still another binary tree of the network topology structure shown in FIG. 2. In FIG. 5, POP21221112133132 is a root node of the binary tree, and POP11, POP12, POP13, POP22, POP21, POP31 and POP32 are leaf nodes of the binary tree.

Figure 6:
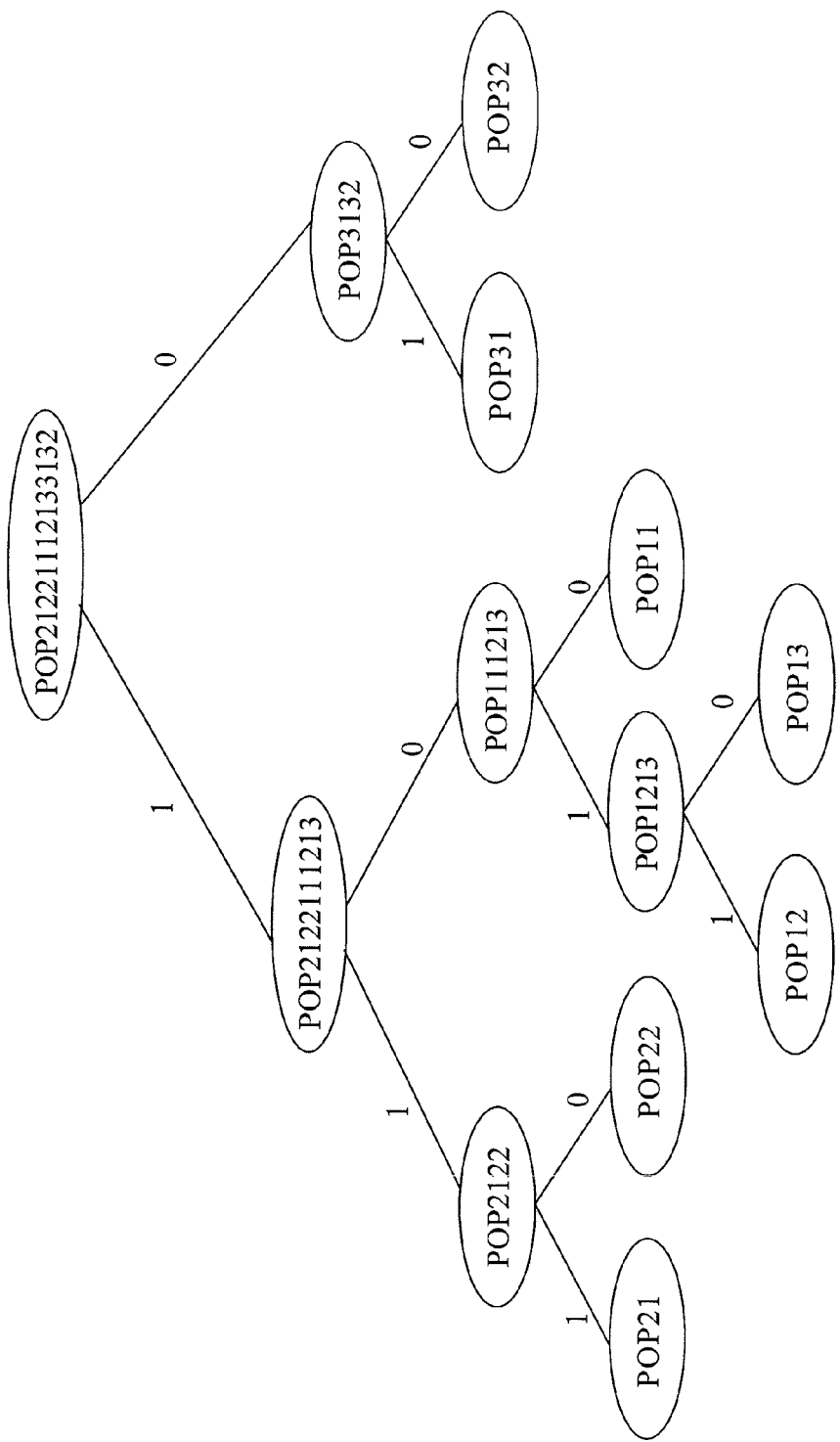
FIG. 6 is a schematic diagram of a binary tree after a left edge and a right edge between any two sibling nodes in the binary tree shown in FIG. 5 are respectively marked with 0 and 1.

In the binary tree in FIG. 5, a left edge between any two sibling nodes is marked with 1, and a right edge between any two sibling nodes is marker with 0. FIG. 6 is a schematic diagram of a binary tree obtained after a left edge and a right edge between any two sibling nodes in the binary tree shown in FIG. 5 are respectively marked with 0 and 1. As shown in FIG. 6, a combination of binary numbers, 0s and 1s, corresponding to edges from a treetop to each leaf node of the binary tree is a peer identifier of the POP node corresponding to the leaf node, and the peer identifier is a peer identifier of each peer connected to the POP node. For example, as for POP11, a combination of the binary numbers corresponding to the edges from the treetop POP21221112133132 to POP11 is 100, and a peer identifier of POP11 is 100; as for POP12, a combination of the binary numbers corresponding to the edges from the treetop POP21221112133132 to POP12 is 1011, and then a peer identifier of POP12 is 1011. Accordingly, a peer identifier of POP13 is 1010, a peer identifier of POP21 is 111, a peer identifier of POP22 is 110, a peer identifier of POP31 is 01, and a peer identifier of POP32 is 00. It can be seen that, in the binary tree shown in FIG. 6, the leaf nodes are in different layers in the binary tree, a code length of the peer identifier of some POP node is short, while a code length of the peer identifier of some POP node is long, thereby not facilitating computation during subsequent POP node selection. In order to solve such a problem, 0 or 1 may be filled into the peer identifier with a short code length till the code length is the same as the code length of peer identifiers of other POP nodes. For the peer identifiers of each POP, a longest code is a four-bit binary number, so that the code lengths of the peer identifiers of all POP are enabled to be four bits by filling with 0 or 1. For example, 0 is added at an end of a peer identifier with a short code length, and the peer identifier of POP22 is 1100, and the peer identifier of POP31 is 0100. Alternatively, all the leaf nodes of the binary tree shown in FIG. 6 are filled and prolonged to the same layer, and during filling, the leaf nodes of the binary tree are prolonged by filling right edges and right children or the leaf nodes of the binary tree are prolonged by filling left edges and left children. A specific method for prolonging is the same as that in the case of generating the peer identifier of the AS-level node, which is not described in detail herein again.

As for the binary trees shown in FIG. 6, alternatively the left edge between any two sibling nodes may be marked with 0, the right edge between any two sibling nodes is marker with 1, and the combination of the binary numbers, 0s and 1s, corresponding to the edges from the treetop to each leaf node of the binary tree is used as the peer identifier of the POP node corresponding to the leaf node.

After the peer identifier of each POP node is obtained, peer identifiers of peers connected to each of the POP nodes are all the peer identifier of the POP node connected to the peers.

(3) Peer-Level Network Mapping Identifiers are Generated.

17 peers are included in the network topology structure shown in FIG. 2, and a method for generating the peer-level peer identifier is similar to the method for generating the AS-level peer identifier and the method for generating the POP-level peer identifier. The method specifically includes the following steps.

Weight values between the peers are obtained according to the obtained topology information of the network, and form a first set P.

Two peers, A3 and B3, corresponding to a smallest weight value in the first set P, are selected to establish a parent node C3 of A3 and B3, a weight value between A3 and B3 in the first set P is deleted, a weight value between the child node A3 and each of other peers, and a weight value between the child node B3 and the peer are replaced by a weight value between the parent node C3 and the peer, and a greater one of a weight value between the child node A3 and each of other peers, and a weight value between the child node B3 and the peer is used as a weight value between the parent node C3 and the peer.

The above step is repeated till only one weight value is left in the first set P, two first nodes An3 and Bn3 corresponding to the left weight value are used as the child nodes to establish a parent node Cn3 of An3 and Bn3, in which the parent node Cn3 is a root node of the generated binary tree.

Some embodiments in which the peer identifiers of various levels are generated by generating the binary tree are introduced in the above, and in these embodiments, the generated binary tree corresponds to nodes of one level, for example, the generated binary tree corresponds to a relation between the AS nodes or POP nodes. An embodiment of the present invention further provides some methods for generating network mapping identifiers of various levels, in which a node of a higher level with large coverage may be used as a parent node to establish a subtree corresponding to a node of a lower level.

The nodes in other embodiments may further include a first node and a second node, and the first node has larger coverage than the second node. A generated peer identifier of a second node corresponding to each leaf node is allocated to each peer belonging to the second node, and the second node belongs to the first node.

The generating the binary tree according to a relation between nodes in the topology information may specifically include the following steps.

A preliminary binary tree is generated according to a relation between first nodes in the topology information.

According to a relation between the second nodes and a relation between each second node and each first node in the topology information, each leaf node of the preliminary binary tree is used as a parent node to establish a subtree under the leaf node of the preliminary binary tree to generate the binary tree.

The generating the preliminary binary tree according to the relation between the first nodes in the topology information may specifically include the following steps.

A first set formed by weight values between first nodes in the network is obtained according to the topology information.

A smallest weight value is selected from the first set, two first nodes A1 and B1 corresponding to the smallest weight value are used as child nodes to establish a parent node C1 of A1 and B1, the smallest weight value is deleted from the first set, and a weight value between the parent node C1 and each of other first nodes i1 is used to replace a weight value between A1 and the first node i1 and a weight value between B1 and the first node i1 in the first set, in which a weight value between the parent node C1 and each of other first nodes i1 is a greater one of a weight value between A1 and the first node i1 and a weight value between B1 and the first node and other first nodes i1 are other first nodes in the network except the first nodes A1 and B1.

A smallest weight value is continuously selected from the first set till only one weight value is left in the first set, two first nodes An1 and Bn1 corresponding to the left weight value are used as child nodes to establish a parent node Cn1 of An1 and Bn1, in which the parent node Cn1 is a root node of the generated preliminary binary tree.

The establishing the subtree under each leaf ode of the preliminary binary tree to generate the binary tree may specifically include the following steps.

A first subset formed by the weight values between the second nodes belonging to any first node A is obtained according to the topology information.

A smallest weight value is selected from the first subset, two second nodes A2 and B2 corresponding to the smallest weight value are used as child nodes to establish a parent node C2 of A2 and B2, the smallest weight value in the first subset is deleted from the first subset, and a weight value between the parent node C2 and each of other second nodes i2 is used to replace a weight value between A2 and the second node i2 and a weight value between B2 and the second node i2 in the first subset, in which a weight value between the parent node C2 and each of other second nodes i2 is a greater one of a weight value between A2 and the second node i2 and the weight value between B2 and the second node i2, and other second nodes i2 are other second nodes in any first node except the second nodes A2 and B2.

A smallest weight value is continuously selected from the first subset till only one weight value is left in the first subset, two second nodes An2 and Bn2 corresponding to the left weight value are used as child nodes to establish a parent node Cn2 of An2 and Bn2, in which the parent node Cn2 replaces the leaf node corresponding to the first node A in the binary tree.

A first subset formed by the weight values between the second nodes belonging to another first node is continuously obtained according to the topology information till the subtree of each leaf node in the binary tree is completely established, thereby generating the binary tree.

A method for generating the peer identifiers is described in the following with reference to the network structure shown in FIG. 2.

A preliminary binary tree is first generated according to a relation between AS nodes. The generated preliminary binary tree may be as shown in FIG. 3.

A subtree of each leaf node of the preliminary binary tree is respectively established. In FIG. 2, POP11, POP12 and POP13 are POP nodes in AS1, POP21 and POP22 are POP nodes in AS2, and POP31 and POP32 are POP nodes in AS3. A method for generating a subtree corresponding to each POP node in AS is similar to the method for generating the subtree during the generation of the POP-level peer identifiers.

For example, a subtree of POP nodes in AS1 is established. First, a first subset M1 formed by the weight values between POP11, POP12 and POP13 in AS1 is obtained and is shown in Table 9.

TABLE 9

| First subset M1 | | |
| --- | --- | --- |
| Node | Node | Weight value |
| POP11 | POP12 | 2 |
| POP11 | POP13 | 2 |
| POP12 | POP13 | 1 |

The two POP nodes, that is, POP12 and POP13, corresponding to a smallest weight value in the first subset M1 shown in Table 9 are selected to establish a parent node POP1213 of POP12 and POP13, a weight value between POP12 and POP13 in the first subset M1 is deleted, a weight value between the child node POP12 and other POP nodes, and a weight value between the child node POP13 and other POP nodes are replaced by a weight value between the parent node POP1112 and other POP nodes, and a greater one of a weight value between the child node POP12 and other POP nodes, and a weight value between the child node POP13 and other POP nodes is used as a weight value between the parent node POP1213 and other POP nodes. After the weight value between POP12 and POP13 in the first subset M1 is deleted, and the weight value between the child node POP12 and each of other POP nodes, and the weight value between the child node POP13 and other POP nodes are replaced by the weight value between the parent node POP1213 and other POP nodes, the first subset M1 is shown in Table 10.

TABLE 10

First subset M1 after the weight value between POP12 and POP13 in the first subset M1 is deleted, and the weight value between the child node POP12 and other POP nodes, and the weight value between the child node POP13 and other POP nodes are replaced by the weight value between the parent node POP1213 and other POP nodes

| Node | Node | Weight value |
|---|---|---|
| POP11 | POP1213 | 2 |

Figure 7:
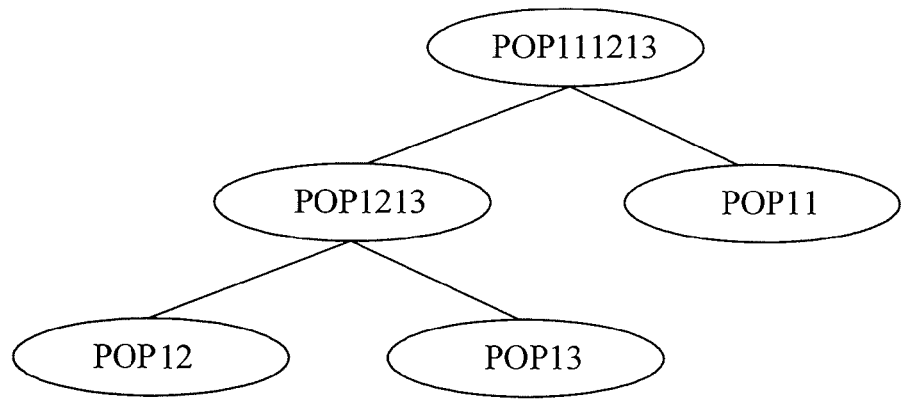
FIG. 7 illustrates a subtree of Point of Presence (POP) nodes in the network topology structure shown in FIG. 2.

Only one weight value is left in the first subset M1 shown in Table 10, and in this case, a parent node POP111213 of two child nodes POP11 and POP1213 corresponding to the weight value may be established. FIG. 7 illustrates a subtree of POP nodes in the network topology structure shown in FIG. 2.

Figure 8:
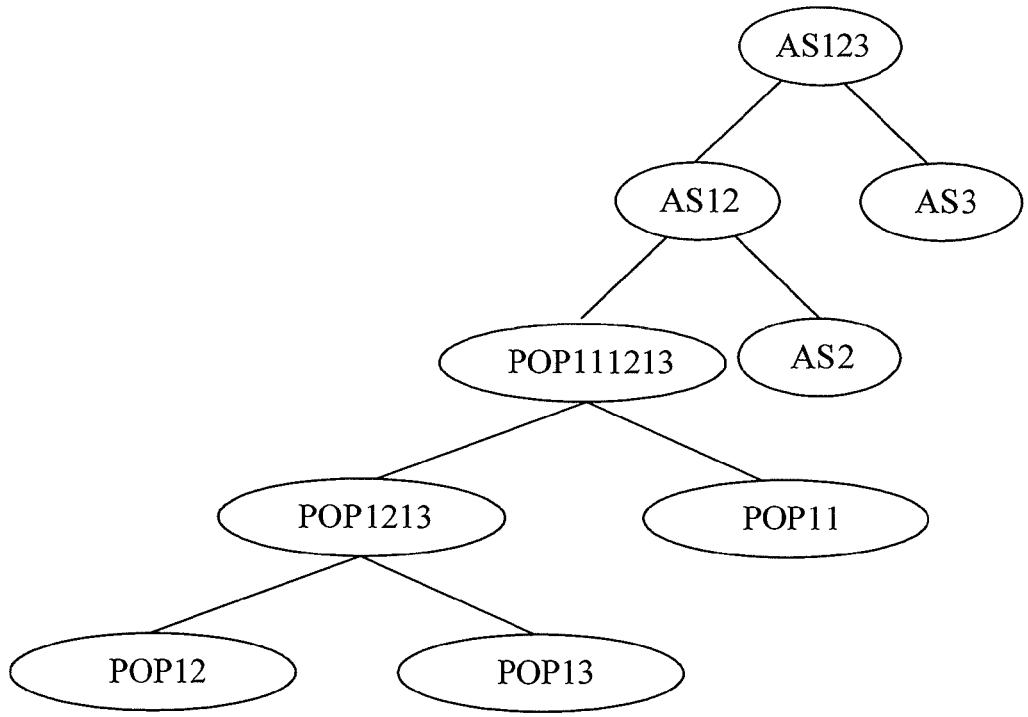

As shown in FIG. 8, POP111213 replaces the AS1 node in the binary tree shown in FIG. 3, and FIG. 8 is a schematic diagram of a subtree of POP nodes under an AS1 node generated on the basis of the binary tree shown in FIG. 3a.

Figure 9:
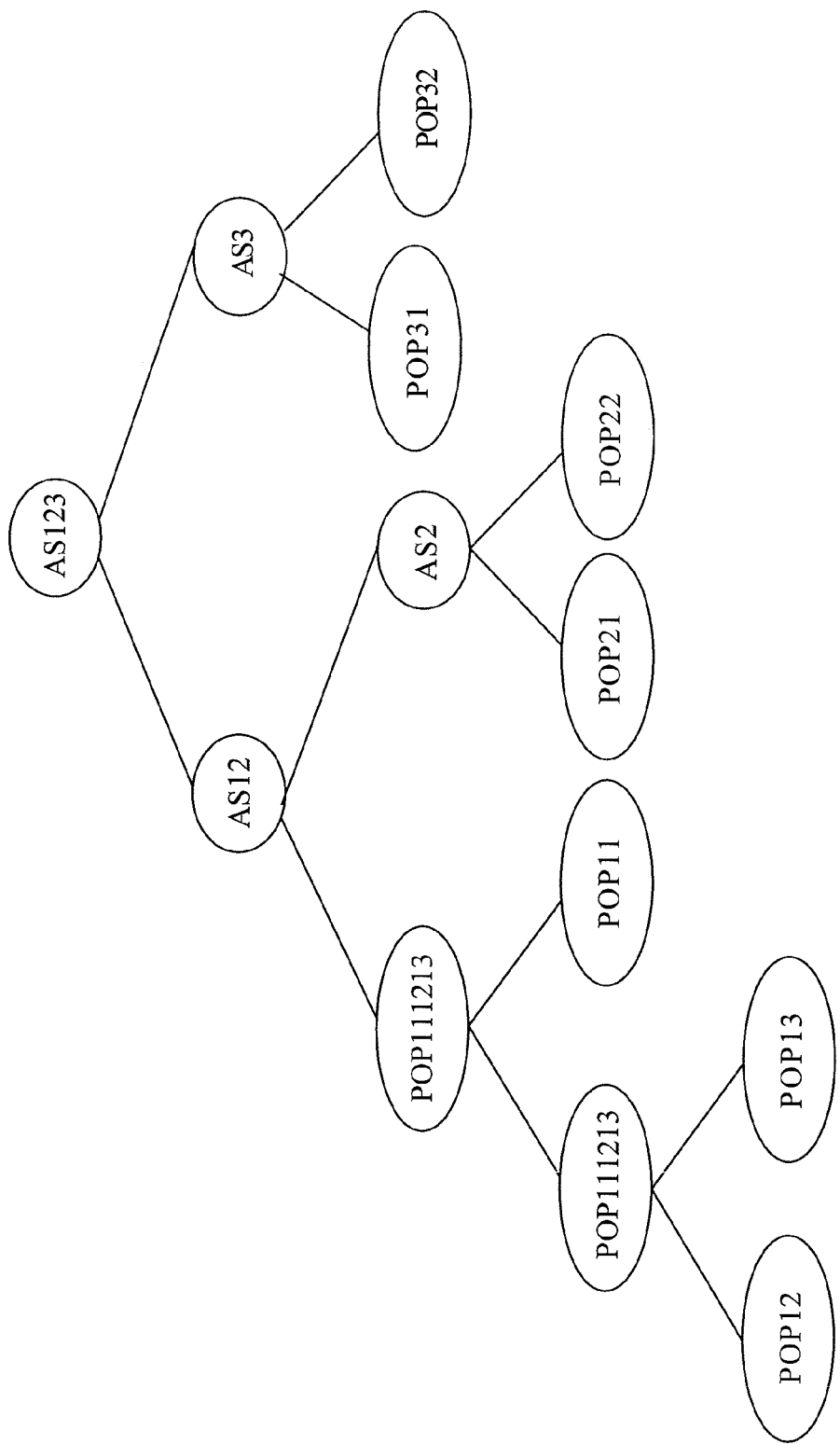

AS2 includes two POPs, that is, POP21 and POP22, in which POP21 and POP22 may be used as child nodes of AS2, and AS2 may be used as a parent node of POP21 and POP22. AS3 includes two POPs, that is, POP31 and POP32, in which POP31 and POP32 may be used as child nodes of AS3, and AS3 may be used as a parent node of POP31 and POP32. FIG. 9 is a schematic diagram of a subtree of POP nodes under an AS node in the binary tree shown in FIG. 3a.

Figure 10:
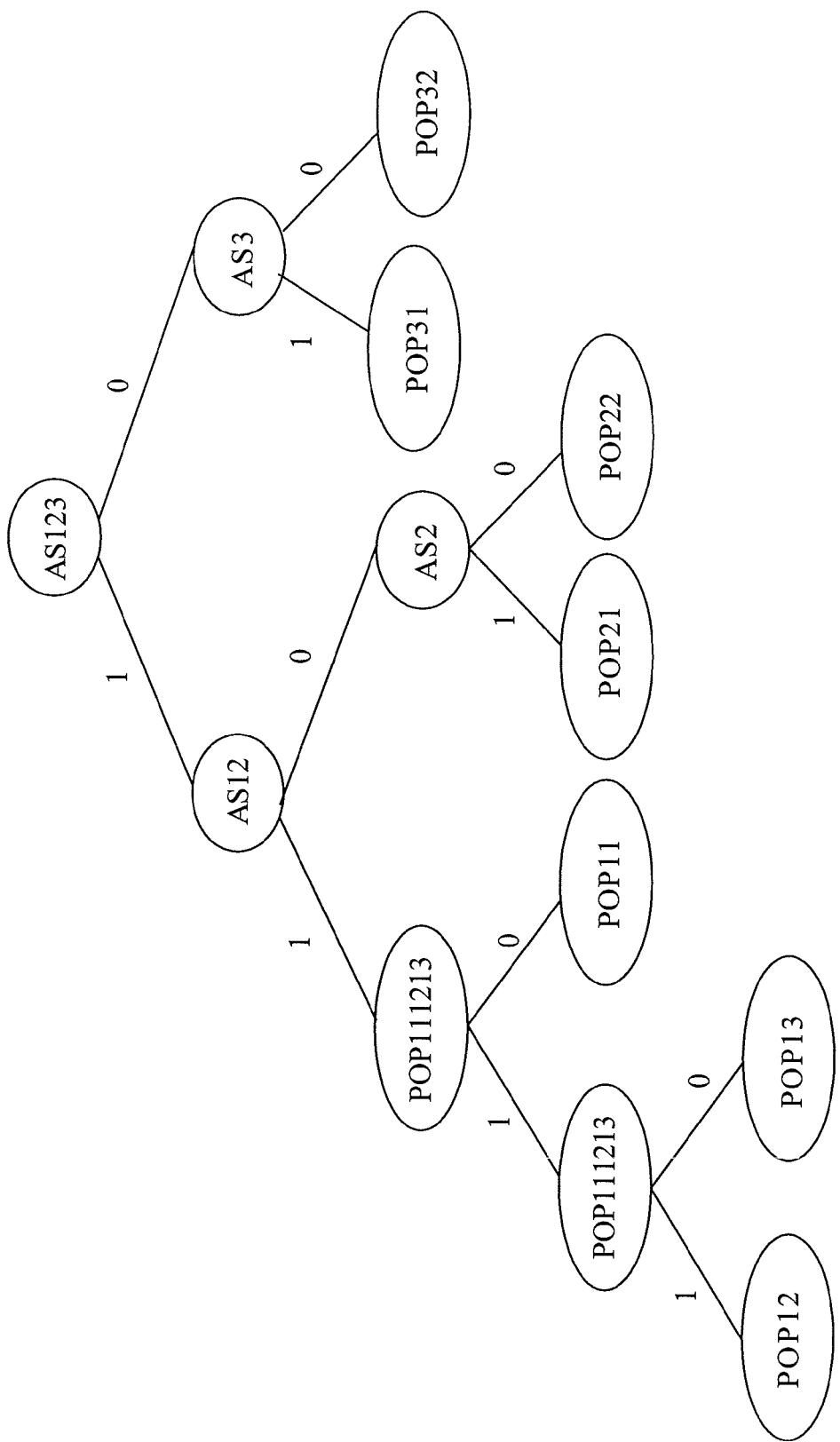
FIG. 10 is a schematic diagram of a binary tree after a left edge and a right edge between any two sibling nodes in the binary tree shown in FIG. 9 are respectively marked with 0 and 1.

In a binary tree in FIG. 9, a left edge between any two sibling nodes is marked with 1, and a right edge between any two sibling nodes is marker with 0. FIG. 10 is a schematic diagram of a binary tree obtained after a left edge and a right edge between any two sibling nodes in the binary tree shown in FIG. 9 are respectively marked with 0 and 1. As shown in FIG. 10, a combination of binary numbers, 0s and 1s, corresponding to the edges from a treetop to each leaf node of the binary tree is a peer identifier of a POP node corresponding to each leaf node, and the peer identifier is peer identifiers of peers connected to the POP node. As for the binary tree shown in FIG. 9, 0 or 1 may be filled into the peer identifiers with a short code length till the code length is the same as the code length of peer identifiers of other POP nodes.

In this way, POP-level identifiers are generated. In the method for generating the POP-level identifiers, an AS node is used as the parent node to establish a subtree of POP-level nodes.

If it is required to generate peer-level peer identifiers, the binary tree shown in FIG. 10 may be used as a preliminary binary tree, and the POP node is used as a parent node to establish a subtree corresponding to the peers. The method for establishing peer-level nodes under a POP node is similar to the method for establishing a subtree of POP nodes, which may include the following steps. A first subset M2 formed by weight values between peers belonging to any POP node is obtained according to the topology information.

A smallest weight value is selected from the first subset M2, two peers A2 and B2 corresponding to the smallest weight value are used as child nodes to establish a parent node C2 of A2 and B2, the smallest weight value in the first subset M2 is deleted from the first subset M2, and a weight value between the parent node C2 and each of other second nodes i2 is used to replace a weight value between A2 and the second node i2 and a weight value between B2 and the second node i2 in the first subset M2, in which a weight value between the parent node C2 and each of other second nodes i2 is a greater one of a weight value between A2 and the second node i2 and a weight value between B2 and the second node i2, and other second nodes i2 are other second nodes in any first node except the second nodes A2 and 32.

A smallest weight value is continuously selected from the first subset M2 till only one weight value is left in the first subset M2, two peers An2 and Bn2 corresponding to the left weight value are used as child nodes to establish a parent node Cn2 of An2 and Bn2, in which the parent node Cn2 replaces the leaf node corresponding to a POP node A in the binary tree.

A first subset M3 formed by weight values between peers belonging to another POP node is continuously obtained according to the topology information till the subtree of each leaf node in the binary tree is completely established, thereby generating the binary tree.

In the above embodiments, the binary tree is generated according to the relation between nodes in the topology information, so that the network mapping identifier capable of indicating a relation between a peer and other peers are generated, and the peer can use the network mapping identifier to select a target peer for data transmission, and it is not required to directly provide the network topology information of the ISP as in the prior art, which can protect the network topology information of the ISP from being exposed, and reduce the load on the ISP since the number of times the p2p traffic server is requested is reduced. A p2p application system does not need to send a source peer and a destination peer to the p2p traffic optimization server, so that private information of the p2p application system can be protected.

Step 102 in Embodiment 1 may also be as follows: multidimensional vectors of various nodes are generated according to a relation between the nodes in the topology information, which specifically includes the following steps.

Weight values between nodes in the network are obtained according to the topology information to construct an n×n matrix Q, in which n is the number of the nodes, $W_{ij}$ is an element in an $i^{th}$ row and a $j^{th}$ column in Q and is a weight value from an $i^{th}$ node to a $j^{th}$ node, and when i=j, $W_{ij}$ is a value greater than or smaller than all weight values between the nodes, i,j∈[1,n].

Q is decomposed into Q1 and Q2, and a product of Q1 and Q2 is Q. Multiple methods for decomposing one matrix Q into the product of two matrixes Q1 and Q2 exist, for example, mathematical methods such as triangular decomposition (also referred to as LU decomposition), QR decomposition (a method for decomposing a matrix into one regular orthogonal matrix and an upper triangular matrix), and singular value decomposition (SVD) may be used for implementation.

Elements in an $i^{th}$ row in Q1 are extracted, and form a source vector of the $i^{th}$ node; and elements in an $i^{th}$ column in Q2 are extracted, and form a destination vector of the $i^{th}$ node; and then the source vector and the destination vector are combined into a multidimensional vector of the $i^{th}$ node.

For example, n first nodes exist, the weight values between the nodes are respectively $W_{11}, W_{12}, W_{13}, \ldots, W_{nn}$, and the constructed n×n matrix Q is as follows:

$$\begin{pmatrix} W_{11} & W_{12} & \ldots & W_{1n} \\ W_{21} & \ddots & & \vdots \\ \vdots & & \ddots & \vdots \\ W_{n1} & \ldots & \ldots & W_{nm} \end{pmatrix}.$$

Q is decomposed into the product of Q1 and Q2, which is as follows:

$$\begin{pmatrix} w_{11} & w_{12} & \cdots & w_{1n} \\ w_{21} & \ddots & & \vdots \\ \vdots & & \ddots & \vdots \\ w_{n1} & \cdots & \cdots & w_{nn} \end{pmatrix} = Q1 \times Q2$$

$$= \begin{pmatrix} C_{sou11} & C_{sou12} & \cdots & C_{sou1n} \\ C_{sou21} & \ddots & & \vdots \\ \vdots & & \ddots & \vdots \\ C_{soun1} & \cdots & \cdots & C_{sounn} \end{pmatrix} \times$$

$$\begin{pmatrix} C_{des11} & C_{des12} & \cdots & C_{des1n} \\ C_{des21} & \ddots & & \vdots \\ \vdots & & \ddots & \vdots \\ C_{desn1} & \cdots & \cdots & C_{desnn} \end{pmatrix}$$

The elements $C_{sou11}$, $C_{sou12}$, $C_{sou13}$, ..., $C_{sou1n}$ in the first row in Q1 are extracted, and form a source part in a vector of the first node. The elements $C_{des11}$, $C_{des21}$, $C_{des31}$, ..., $C_{des1n}$ in the first column in Q2 are extracted, and form a destination part of the vector of the first node. The source part and the destination part are combined into a multidimensional vector ($C_{sou11}$, $C_{sou12}$, $C_{sou13}$, . . . , $C_{sou1n}$, $C_{des11}$, $C_{des21}$, $C_{des31}$, . . . , $C_{desn1}$) of the first node, in which the multidimensional vector is used as a peer identifier of the first node. The multidimensional vectors of the rest nodes may be obtained through the similar method.

The weight values between the nodes can be obtained according to the topology information. Q further includes the elements when i=j, and when the greater the weight value between the nodes is, the shorter the distance between the nodes is, as for all of the elements when i=j, the values thereof may be set to values greater than all of the weight values between the first nodes. When the smaller the weight value between the nodes is, the shorter the distance between the nodes is, as for all of the elements when i=j, the values thereof may be set to values smaller than all of the weight values between the first nodes.

The nodes may be AS nodes, POP nodes or peers. When the nodes are the AS nodes, the allocating the generated peer identifiers to the peers specifically includes: allocating the generated peer identifier of each of the AS nodes to the peers included in the AS node.

When the nodes are the POP nodes, the allocating the generated peer identifiers to the peers specifically includes: allocating the generated peer identifier of each of the POP node to the peers connected to the POP node.

Figure 11:
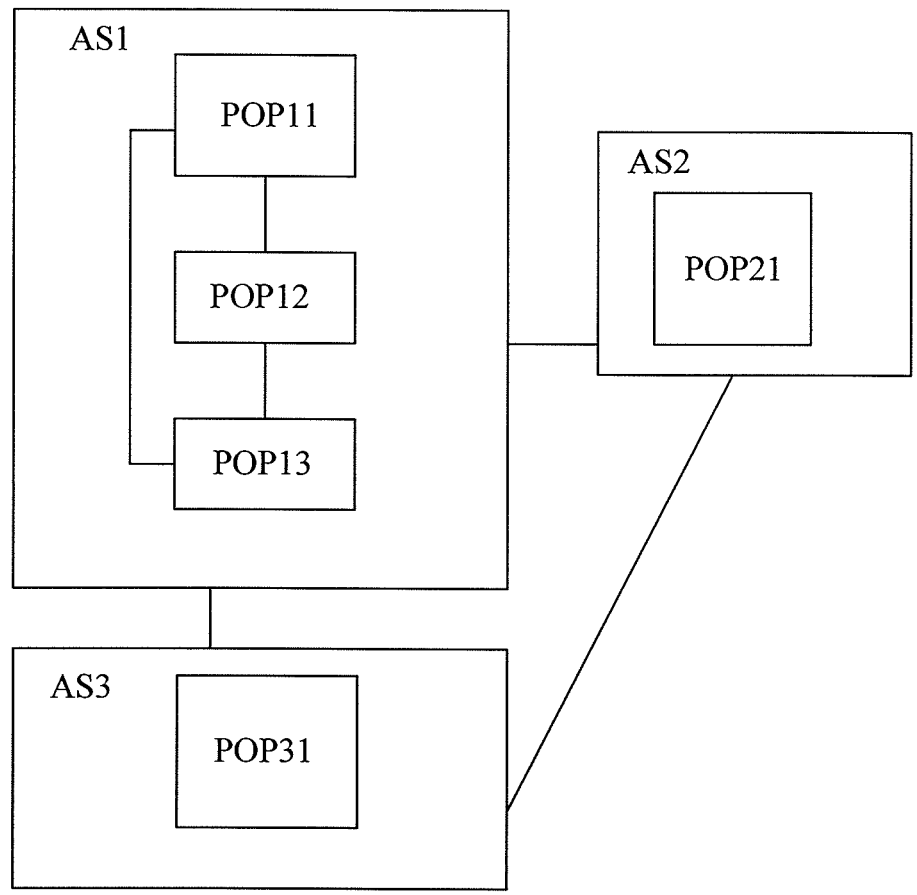
FIG. 11 illustrates another relevant network topology structure according to an embodiment of the present invention.

FIG. 11 illustrates another relevant network topology structure according to an embodiment of the present invention. The structure is a network managed by an ISP, the network includes three ASs, that is, AS1, AS2 and AS3; AS1 includes three POPs, that is, POP11, POP12 and POP13; AS2 includes a POP, that is, POP21; and AS3 includes a POP, that is, POP31.

In the network architecture shown in FIG. 11, peer identifiers may be generated through the following multidimensional vector generation methods according to the following constructions.

(1) AS-level peer identifiers are generated.
Weight Values Between as Nodes are as Shown in Table 11.

TABLE 11

Weight values between AS nodes in FIG. 11

| Node | Node | Weight value |
|---|---|---|
| AS1 | AS2 | 2 |
| AS1 | AS3 | 1 |
| AS2 | AS1 | 3 |
| AS2 | AS3 | 2 |
| AS3 | AS1 | 1 |
| AS3 | AS2 | 3 |

Table 11 shows the weight values between the nodes. As for any two nodes, if directions are different, weight values are also different. For example, a weight value from AS1 to AS2 is 2, and a weight value from AS2 to AS1 is 3.

According to the weight values shown in Table 11, a 3×3 matrix Q is constructed as follows:

$$Q = \begin{bmatrix} W_{11} & W_{12} & W_{13} \\ W_{21} & W_{22} & W_{23} \\ W_{31} & W_{32} & W_{33} \end{bmatrix} = \begin{bmatrix} 4 & 2 & 1 \\ 3 & 4 & 2 \\ 1 & 3 & 4 \end{bmatrix}.$$

In the embodiment of the present invention, an example is taken for illustration, in which a larger weight value between two nodes indicates a shorter distance between the two nodes. In the above matrix, as for the elements when i=j, a value of $W_{ij}$ is set to 4, which is greater than all weight values between AS nodes, that is, the values of $W_{11}$, $W_{22}$ and $W_{33}$ are all set to 4.

The matrix Q is decomposed into the product of Q1 and Q2, which is as follows:

$$Q = \begin{bmatrix} W_{11} & W_{12} & W_{13} \\ W_{21} & W_{22} & W_{23} \\ W_{31} & W_{32} & W_{33} \end{bmatrix}$$

$$= \begin{bmatrix} 4 & 2 & 1 \\ 3 & 4 & 2 \\ 1 & 3 & 4 \end{bmatrix}$$

$$= Q1 \times Q2$$

$$= \begin{bmatrix} C_{sou11} & C_{sou12} & C_{sou13} \\ C_{sou21} & C_{sou22} & C_{sou23} \\ C_{sou31} & C_{sou32} & C_{sou33} \end{bmatrix} \times \begin{bmatrix} C_{des11} & C_{des12} & C_{des13} \\ C_{des21} & C_{des22} & C_{des23} \\ C_{des31} & C_{des32} & C_{des33} \end{bmatrix}$$

$$= \begin{bmatrix} 1 & 0 & 0 \\ 0.75 & 1 & 0 \\ 0.25 & 1 & 1 \end{bmatrix} \times \begin{bmatrix} 4 & 2 & 1 \\ 0 & 2.5 & 1.25 \\ 0 & 0 & 2.5 \end{bmatrix}$$

The elements $C_{sou11}$, $C_{sou12}$, and $C_{sou13}$ in the first row in Q1 are extracted, and form a source part of a vector of AS1. The elements $C_{des11}$, $C_{des21}$, and $C_{des31}$ in the first column in Q2 are extracted, and form a destination part of the vector of AS1. The source part and the destination part are combined into a multidimensional vector ($C_{sou11}$, $C_{sou12}$, $C_{sou13}$, $C_{des11}$, $C_{des21}$, $C_{des31}$) of the first node. The multidimensional vector is used as a peer identifier of AS1. Accordingly a peer identifier of AS2 is ($C_{sou21}$, $C_{sou22}$, $C_{sou23}$, $C_{des12}$, $C_{des22}$, $C_{des32}$), and a peer identifier of AS3 is ($C_{sou31}$, $C_{sou32}$, $C_{sou33}$, $C_{des13}$, $C_{des23}$, $C_{des33}$).

(2) POP-Level Peer Identifiers are Generated.

Weight values between the POP nodes are as Shown in Table 12.

TABLE 12

Weight values between POP nodes in FIG. 11

| Node | Node | Weight value |
|------|------|--------------|
| POP11 | POP12 | 15 |
| POP11 | POP13 | 12 |
| POP11 | POP21 | 8 |
| POP11 | POP31 | 4 |
| POP12 | POP11 | 16 |
| POP12 | POP13 | 12 |
| POP12 | POP21 | 7 |
| POP12 | POP31 | 3 |
| POP13 | POP11 | 5 |
| POP13 | POP12 | 16 |
| POP13 | POP21 | 8 |
| POP13 | POP31 | 2 |
| POP21 | POP11 | 10 |
| POP21 | POP12 | 11 |
| POP21 | POP13 | 9 |
| POP21 | POP31 | 6 |
| POP31 | POP11 | 3 |
| POP31 | POP12 | 2 |
| POP31 | POP13 | 3 |
| POP31 | POP21 | 6 |

According to the weight values shown in Table 12, a 5×5 matrix Q is constructed as follows:

$$Q = \begin{bmatrix} W_{11} & W_{12} & W_{13} & W_{14} & W_{15} \\ W_{21} & W_{22} & W_{23} & W_{24} & W_{25} \\ W_{31} & W_{32} & W_{33} & W_{34} & W_{35} \\ W_{41} & W_{42} & W_{43} & W_{44} & W_{45} \\ W_{51} & W_{52} & W_{53} & W_{54} & W_{55} \end{bmatrix} = \begin{bmatrix} 18 & 15 & 12 & 8 & 4 \\ 16 & 18 & 12 & 7 & 3 \\ 15 & 16 & 18 & 8 & 2 \\ 10 & 11 & 9 & 18 & 6 \\ 3 & 2 & 3 & 6 & 18 \end{bmatrix}.$$

The matrix Q is decomposed into the product of Q1 and Q2, which is as follows:

$$Q = \begin{bmatrix} 18 & 15 & 12 & 8 & 4 \\ 16 & 18 & 12 & 7 & 3 \\ 15 & 16 & 18 & 8 & 2 \\ 10 & 11 & 9 & 18 & 6 \\ 3 & 2 & 3 & 6 & 18 \end{bmatrix}$$

$$= Q1 \times Q2$$

$$= \begin{bmatrix} 1.0000 & 0 & 0 & 0 & 0 \\ 0.8889 & 1.0000 & 0 & 0 & 0 \\ 0.8333 & 0.7500 & 1.0000 & 0 & 0 \\ 0.5556 & 0.5714 & 0.2245 & 1.0000 & 0 \\ 0.1667 & -0.1071 & 0.1633 & 0.3326 & 1.0000 \end{bmatrix} \times$$

$$\begin{bmatrix} 18.0000 & 15.0000 & 12.0000 & 8.0000 & 4.0000 \\ 0 & 4.6667 & 1.3333 & -0.1111 & -0.5556 \\ 0 & 0 & 7.0000 & 1.4167 & -0.9167 \\ 0 & 0 & 0 & 13.3010 & 4.3010 \\ 0 & 0 & 0 & 0 & 15.9931 \end{bmatrix}$$

The elements in the first row in Q1 are extracted, and form a source part of a vector of POP11. The elements in the first column in Q2 are extracted, and form a destination part of the vector of POP11. The source part and the destination part form a multidimensional vector (1.0000, 0, 0, 0, 0, 0, 18.0000, 0, 0, 0, 0) of POP11, and the multidimensional vector is used as a peer identifier of POP11. Accordingly a peer identifier of POP12 is (0.8889, 1.0000, 0, 0, 0, 15.0000, 4.6667, 0, 0, 0), a peer identifier of POP13 is (0.8333, 0.7500, 1.0000, 0, 0, 12.0000, 1.3333, 7.0000, 0, 0), a peer identifier of POP21 is (0.5556, 0.5714, 0.2245, 1.0000, 0, 8.0000, −0.1111, 1.4167, 13.3010, 0), and a peer identifier of POP31 is (0.1667, −0.1071, 0.1633, 0.3326, 1.0000, 4.0000, −0.5556, −0.9167, 4.3010, 15.9931).

(3) Peer-Level Identifiers are Generated.

FIG. 11 does not show the peers. When the POP nodes may be respectively connected to a plurality of peers, the method for generating the peer-level peer identifier is the same as the method for generating the POP-level peer identifier, which is not described in detail herein again.

Some embodiments in which the peer identifiers of various levels are generated by generating the multidimensional vectors are introduced in the above, and in these embodiments, the multidimensional vectors are generated according to the weight values between nodes of various levels. An embodiment of the present invention further provides some methods for generating peer identifiers of various levels, in which source parts and destination parts of generated multidimensional vectors of various levels are combined to form peer identifiers.

In the embodiment shown in FIG. 1, the nodes may include the first nodes and the second nodes, and the second nodes belong to the first nodes. The generating the peer identifier capable of indicating a relation between each peer and other peers in the network according to the topology information specifically includes the following steps.

A multidimensional vector of a first node is obtained, in which the multidimensional vector of the first node includes a source part and a destination part.

A multidimensional vector of a second node is obtained, in which the multidimensional vector of the second node includes a source part and a destination part.

A combination of the source part of the multidimensional vector of the first node and the source part of the multidimensional vector of the second node is called a first source part, a combination of the destination part of the multidimensional vector of the first node and the destination part of the multidimensional vector of the second node is called a first destination part, and the first source part and the first destination part are combined into a peer identifier of a peer in the second node.

The obtaining the multidimensional vector of the first node may include the following steps.

Weight values between the first nodes in the network are obtained according to the topology information to construct an n×n matrix Q, in which n is the number of the first nodes, $W_{ij}$ is an element in an $i^{th}$ row and a $j^{th}$ column in Q and is a weight value between an $i^{th}$ first node and a $j^{th}$ first node, and when i=j, $W_{ij}$ is a value greater than or smaller than all weight values between the first nodes, i,j∈[1,n].

Q is decomposed into Q1 and Q2, and a product of Q1 and Q2 is Q.

Elements in the $i^{th}$ row in Q1 are extracted, and form a source part of a multidimensional vector of the $i^{th}$ first node. Elements in an $i^{th}$ column in Q2 are extracted, and form a destination part of the multidimensional vector of the $i^{th}$ first node. The source part of the multidimensional vector of the $i^{th}$ first node and the destination part of the multidimensional vector of the $i^{th}$ first node are combined into the multidimensional vector of the $i^{th}$ first node.

The obtaining the multidimensional vector of the second node may include the following steps.

Weight values between the second nodes in the network are obtained according to the topology information to construct an m×m matrix P, in which m is the number of the second nodes, $P_{xy}$ is an element in an $x^{th}$ row and a $y^{th}$ column in P and is a weight value between the an $x^{th}$ second node and an $y^{th}$ second node, and when x=y, $P_{xy}$ is a value greater than or smaller than all weight values between the second nodes, x,y∈[1,m].

P is decomposed into P1 and P2, and a product of P1 and P2 is P.

Elements in the $x^{th}$ row in P1 are extracted, and form a source part of a multidimensional vector of the $x^{th}$ second node. Elements in a $y^{th}$ row in P2 are extracted, and form a destination part of the multidimensional vector of the $x^{th}$ second node. The source part of the multidimensional vector of the $x^{th}$ second node and the destination part of the multidimensional vector of the $x^{th}$ second node are combined into the multidimensional vector of the $x^{th}$ second node.

A method for generating the peer identifiers is described in the following with reference to the network structure shown in FIG. 11.

In FIG. 11, AS1 includes POP11, POP12 and POP13, in which AS1 is equivalent to a first node, and POP11, POP12 and POP13 are equivalent to second nodes.

POP11 is taken as an example. Multidimensional vectors of AS1 and POP11 are obtained first, and the method for obtaining the multidimensional vectors of AS1 and POP11 is the same as that in the description in the above.

Then, a source part of the multidimensional vector of AS1 and a source part of the multidimensional vector of POP11 are combined into a first source part of a multidimensional vector of each peer in POP11. A destination part of the multidimensional vector of AS1 and a destination part of the multidimensional vector of POP11 are combined into a first destination part of the multidimensional vector of each peer in POP11. The first source part and the first destination part are combined into a multidimensional vector of the peer in POP11. The multidimensional vector of POP11 and the multidimensional vector of AS1 may respectively be multiplied by different coefficients to distinguish the level of AS1 and that of POP11. For example, the destination part of the multidimensional vector of AS1 is multiplied by 10, the destination part of the multidimensional vector of POP11 is multiplied by 1, and the destination part of the multidimensional vector of AS1 and the destination part of the multidimensional vector of POP11 obtained after being multiplied by the coefficients are combined into a first destination part of the multidimensional vector of each peer.

AS2 merely includes POP21, the number of dimensions of a generated peer identifier of each peer in POP21 may be different from the number of dimensions of the peer identifier of each peer in AS1. As for a peer identifier with a smaller number of dimensions, a 0 may be complemented, so that the number of dimensions of the peer identifier of each peer is the same.

When the number of dimensions of the generated peer identifier is excessively large, dimension reduction may be performed through methods such as Principal Component Analysis (PCA), and on the premise that the generated peer identifier of the peer is capable of indicating the relation between the peer and other peers in the network, the number of dimensions of the peer identifier is enabled to be decreased.

In the above embodiments, the multidimensional vectors of various nodes are generated according to the relation between the nodes in the topology information, and then the network mapping identifier capable of indicating a relation between a peer and other peers is generated, so that the peer can use the network mapping identifier to select a target peer for data transmission, and it is not required to directly provide the network topology information of the ISP as in the prior art, which can protect the network topology information of the ISP from being exposed, and reduce the load on the ISP since the number of times the p2p traffic server is requested is reduced. A p2p application system does not need to send a source peer and a destination peer to the p2p traffic optimization server, so that private information of the p2p application system can be protected.

Step 102 in Embodiment 1 may also be as follows: Multidimensional space coordinates of nodes are generated according to a relation between the nodes in the topology information. Various methods in the prior art may be used to generate the multidimensional space coordinates of the nodes, which are not described in detail herein again. The generated multidimensional space coordinates may be used as a peer identifier of each peer.

In the network shown in FIG. 2 and FIG. 11, the various AS nodes, POP nodes, or peers belong to the same ISP, the generated peer identifiers and ISP identifiers of the ISP to which the various AS nodes or POP nodes belong may be combined into the network mapping identifiers. The various AS nodes, POP nodes or peers may also belong to different ISPs, and in such a case, the generated peer identifier may be used as the network mapping identifier.

Figure 12:
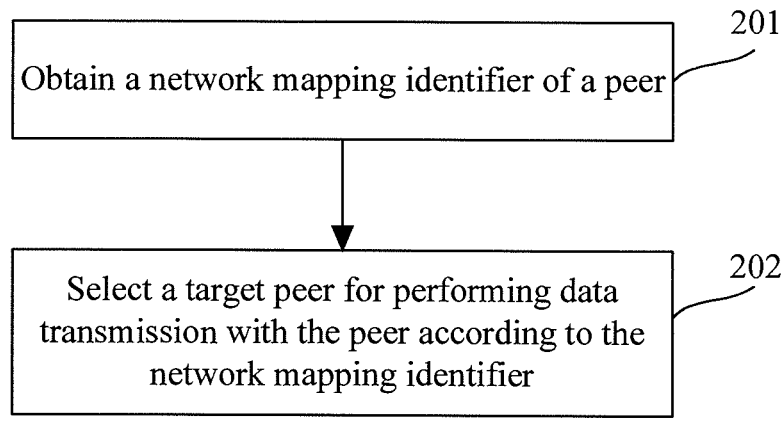
FIG. 12 is a flow chart of a peer selection method using a network mapping identifier according to the present invention.

FIG. 12 is a flow chart of a peer selection method using a network mapping identifier according to the present invention, where the method includes the following steps.

Step 201: Obtain a network mapping identifier of a peer, in which the network mapping identifier indicates a relation between the peer and other peers in the network.

Step 202: Select a target peer for performing data transmission with the peer according to the network mapping identifier.

The network mapping identifier may include an ISP identifier and a peer identifier, or may merely include the peer identifier.

If the network mapping identifier obtained in step 201 is obtained by a p2p traffic optimization server through the method of generating a binary tree corresponding to the topology information of the network, step 202 may specifically include: obtaining a candidate peer list; performing exclusive-or operation on a peer identifier of each candidate peer having the same ISP identifier as the peer and the peer identifier of the peer, and selecting a candidate peer of a smallest exclusive-or operation result as the target peer.

If the peer identifier obtained in step 201 is obtained by a p2p traffic optimization server through the method of generating a multidimensional vector corresponding to the topology information of the network, step 202 may specifically include: obtaining a candidate peer list; calculating an inner product of a network mapping identifier of each candidate peer having the same ISP identifier as the peer and the peer identifier of the peer, and using a candidate peer of the greatest or smallest inner product as the target peer for performing data transmission with the peer. If in the matrix Q constructed in the above embodiment, $W_{ij}$ is a value greater than all weight values between the nodes, in step 201, a candidate peer of a greatest inner product may be used as the target peer for performing data transmission with the peer. If in the matrix Q constructed in the above embodiment, $W_{ij}$ is a value smaller than all weight values between the nodes, in step 201, a candidate peer of the smallest inner product may be used as the target peer for performing data transmission with the peer.

If the peer identifier obtained in step 201 is obtained by a p2p traffic optimization server through the method of generating a multidimensional space coordinate corresponding to the topology information of the network, step 202 may specifically include: obtaining a candidate peer list; calculating a Euclidean distance between a peer identifier of each candidate peer having the same ISP identifier as the peer and the peer identifier of the peer, and using the candidate peer of a shortest Euclidean distance as the target peer for performing data transmission with the peer.

In the method shown in FIG. 12, the target peer for performing data transmission with the peer is selected according to the network mapping identifier, and it is not required to directly provide the network topology information of the ISP, which can protect the network topology information of the ISP from being exposed, and reduce the load on the ISP since the number of times the p2p traffic server is requested is reduced. A p2p application system does not need to send a source peer and a destination peer to the p2p traffic optimization server, so that private information of the p2p application system can be protected.

Figure 13:
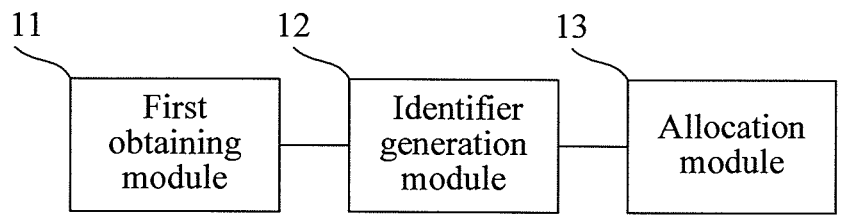
FIG. 13 is a schematic structure diagram of Embodiment 1 of a device for processing a network mapping identifier according to the present invention.

FIG. 13 is a schematic structure diagram of Embodiment 1 of a device for processing a network mapping identifier according to the present invention, where the device includes: a first obtaining module 11, an identifier generation module 12 and an allocation module 13. The identifier generation module 12 is connected to the first obtaining module 11 and the allocation module 13. The first obtaining module 11 is configured to obtain topology information of a network, in which the topology information includes a relation between nodes in the network; the identifier generation module 12 is configured to generate a network mapping identifier capable of indicating a relation between each peer and other peers in the network according to the topology information obtained by the first obtaining module 11; and the allocation module 13 is configured to allocate the network mapping identifiers generated by the identifier generation module 12 to the peers.

The identifier generation module 12 may specifically be configured to generate a peer identifier capable of indicating a relation between each peer and other nodes in the network according to the topology information obtained by the first obtaining module 11, and use the peer identifier as the network mapping identifier; or generate a peer identifier capable of indicating a relation between each peer and other peers in the network according to the topology information obtained by the first obtaining module 11, generate an ISP identifier, and combine the ISP identifier and the peer identifier into the network mapping identifier. The identifier generation module 12 may be specifically configured to generate a binary tree according to a relation between nodes in the topology information, mark a left edge between any two sibling nodes in the binary tree as 1, mark a right edge between any two sibling nodes in the binary tree as 0, and form binary numbers, 0s and 1s, from a treetop to each leaf node of the binary tree into a binary code to generate a peer identifier of a node corresponding to the leaf node.

Alternatively, the identifier generation module 12 is configured to generate a binary tree according to a relation between nodes in the topology information, mark a left edge between any two sibling nodes in the binary tree as 0, mark a right edge between any two sibling nodes in the binary tree as 1, and form binary numbers, 0s and 1s, from a treetop to each leaf node of the binary tree into a binary code to generate a peer identifier of a node corresponding to the leaf node.

The identifier generation module 12 may specifically be configured to obtain weight values between nodes in the network according to the topology information to construct an n×n matrix Q, in which n is the number of the nodes, $W_{i,j}$ is an element in an $i^{th}$ row and a $j^{th}$ column in Q and $W_{i,j}$ is a weight value between the an $i^{th}$ node and a $j^{th}$ node, and when i=j, $W_{ij}$ is a greatest value or a smallest value of all of the weight values between the nodes, i,j∈[1,n].

The identifier generation module 12 decomposes Q into Q1 and Q2, and a product of Q1 and Q2 is Q.

The identifier generation module 12 extracts elements in an $i^{th}$ row in Q1, and forms a source part of a multidimensional vector of the $i^{th}$ node by using the elements in the $i^{th}$ row in Q1; extracts elements in an $i^{th}$ row in Q2, and forms a destination part of the multidimensional vector of the $i^{th}$ node by using the elements in the $i^{th}$ row in Q2; combines the source part and the destination part into the multidimensional vectors of the $i^{th}$ node, and uses the multidimensional vector as a peer identifier of the node.

The identifier generation module 12 may also be specifically configured to generate multidimensional coordinates of each peer according to the topology information, and use the multidimensional coordinates as the peer identifier of the peer.

Figure 14:
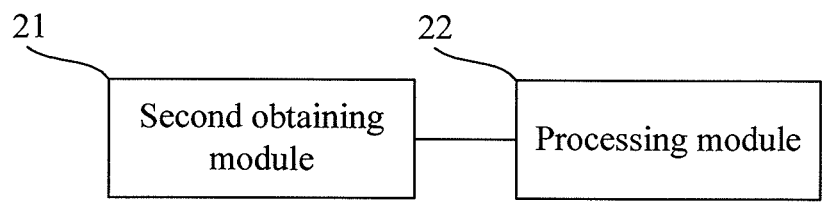
FIG. 14 is a schematic structure diagram of Embodiment 2 of a device for processing a network mapping identifier according to the present invention.

FIG. 14 is a schematic structure diagram of Embodiment 2 of a device for processing a network mapping identifier according to the present invention, where the device includes: a second obtaining module 21 and a processing module 22 that are connected to each other. The second obtaining module 21 is configured to obtain a network mapping identifier of the peer, in which the network mapping identifier is capable of indicating a relation between the peer and other peers in the network; and the processing module 22 is configured to select a target peer for performing data transmission with the peer according to the network mapping identifier.

The processing module 22 may be specifically configured to obtain a candidate peer list, perform exclusive-or operation on a network mapping identifier of each candidate peer having the same ISP identifier as the peer and the network mapping identifier of the peer, and select the candidate peer of a smallest exclusive-or operation result as the target peer.

Alternatively, the processing module 22 may be specifically configured to obtain a candidate peer list, calculate an inner product of a network mapping identifier of each candidate peer having the same ISP identifier as the peer and the network mapping identifier of the peer, and use a candidate peer of a smallest inner product as the target peer.

Alternatively, the processing module 22 may be specifically configured to obtain a candidate peer list, calculate a Euclidean distance between a network mapping identifier of each candidate peer having the same ISP identifier as the peer and the network mapping identifier of the peer, and use a candidate peer of the shortest Euclidean distance as the target peer.

Figure 15:
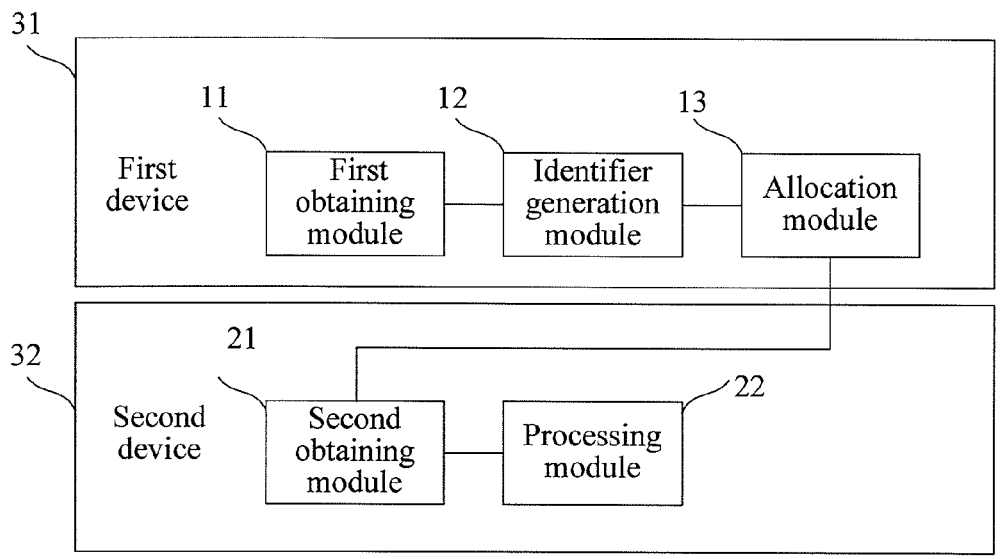
FIG. 15 is a schematic structure diagram of Embodiment 1 of a system for processing a network mapping identifier according to the present invention.
Figure 16:
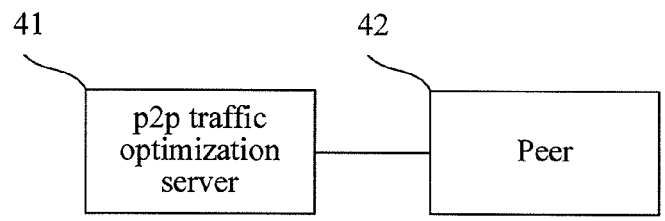
FIG. 16 is a schematic diagram of a relevant structured p2p network according to an embodiment of the present invention.

FIG. 15 is a schematic structure diagram of Embodiment 1 of a system for processing a network mapping identifier according to the present invention. As shown in FIG. 15, the system includes a first device 31 and a second device 32, in which the first device 31 is the device for processing the network mapping identifier shown in FIG. 13, the second device 32 is the device for processing the network mapping identifier shown in FIG. 14, and the allocation module 13 in the first device 31 is connected to the second obtaining module 21. The function of each module in the first device 31 and the function of each module in the second device 32 have been introduced in the above description. FIG. 16 is a schematic diagram of a relevant structured p2p network according to an embodiment of the present invention, where the network includes a p2p traffic optimization server 41 and a peer 42. The p2p traffic optimization server 41 is mainly responsible for allocating the network mapping identifier to the peer 42 and optimizing the traffic in the p2p network. The first device shown in FIG. 16 may be disposed in the p2p traffic optimization server 41, and the second device may be disposed in the peer 42.

Figure 17:
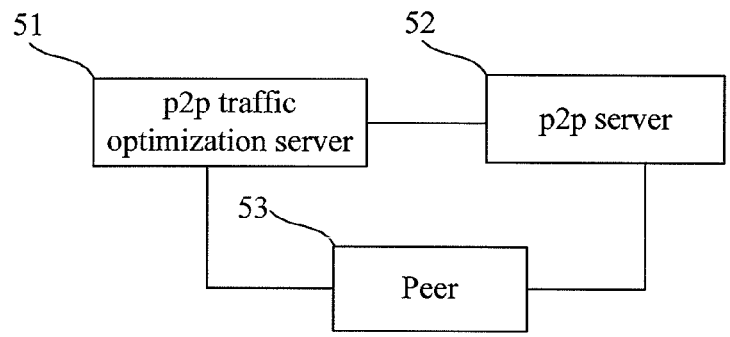
FIG. 17 is a schematic diagram of a relevant unstructured p2p network according to an embodiment of the present invention.

FIG. 17 is a schematic diagram of a relevant unstructured p2p network according to an embodiment of the present invention, where the network includes a p2p traffic optimization server 51, a peer 53 and a p2p server (tracker) 52. The p2p traffic optimization server 51 is mainly responsible for allocating a network mapping identifier to the peer 52 and optimizing the traffic in the p2p network; and the p2p server 52 is mainly responsible for obtaining a candidate list for the peer 53. The first device shown in FIG. 15 may be disposed in the p2p traffic optimization server 51, and the second device may be disposed in the p2p server 52. After the p2p server 52 obtains the target peer, the p2p server 52 sends the target peer to the peer 53.

The embodiments of the present invention or a part thereof may be implemented by using software, and a corresponding software program may be stored in a readable storage medium, for example, an optical disk, a hard disk, or a floppy disk.

Finally, it should be noted that the above embodiments are merely provided for describing the technical solutions of the present invention, but not intended to limit the present invention. It should be understood by persons of ordinary skill in the art that although the present invention has been described in detail with reference to the exemplary embodiments, modifications or equivalent replacements can be made to the technical solutions of the present invention, and such modifications or replacements do not cause the modified technical solutions to depart from the spirit and scope of the present invention.

What is claimed is:

1. A method for processing a network mapping identifier, the method comprising:
    obtaining, by a peer to peer (p2p) traffic optimization server, topology information of a network, wherein the topology information comprises a relation between nodes in the network;
    generating, by the p2p traffic optimization server, a network mapping identifier capable of indicating a relation between a peer and other peers in the network according to the topology information; and
    allocating, by the p2p traffic optimization server, the generated network mapping identifier to the peer;
    wherein generating the network mapping identifier comprises:
        generating, by the p2p traffic optimization server, a peer identifier capable of indicating a relation between the peer and other nodes in the network according to the topology information, and using the peer identifier as the network mapping identifier; or
        generating, by the p2p traffic optimization server, a peer identifier capable of indicating the relation between each peer and other peers in the network according to the topology information;
    generating, by the p2p traffic optimization server, an Internet Service Provider (ISP) identifier for indicating a relation between each ISP and other ISPs in the network; and
    combining, by the p2p traffic optimization server, the ISP identifier and the peer identifier into the network mapping identifier;
    wherein the relation between the nodes in the network is weight values between the nodes in the network; and
    the ISP identifier is a number, a string, or an identifier allocated according to an ISP policy;
    wherein generating, by the p2p traffic optimization server, the peer identifier capable of indicating the relation between the peer and other peers in the network according to the topology information comprises:
        obtaining, by the p2p traffic optimization server, weight values between the nodes in the network according to the topology information to construct an n×n matrix Q, wherein n is the number of the nodes, $W_{ij}$ is an element in an $i^{th}$ row and a $j^{th}$ column in Q and is a weight value from an $i^{th}$ node to a $j^{th}$ node, and when i=j, $W_{ij}$ is a value greater than or smaller than all weight values between the nodes, $i,j\in[1,n]$;
        decomposing, by the p2p traffic optimization server, Q into Q1 and Q2, wherein a product of Q1 and Q2 is Q;
        extracting, by the p2p traffic optimization server, elements in an $i^{th}$ row in Q1, and using the elements in the $i^{th}$ row in Q1 to form a source part of a multidimensional vector of the $i^{th}$ node;
        extracting elements in an $i^{th}$ row in Q2, and using, by the p2p traffic optimization server, the elements in the $i^{th}$ row in Q2 to form a destination part of the multidimensional vector of the $i^{th}$ node; and
        combining, by the p2p traffic optimization server, the source part and the destination part into the multidimensional vector of the $i^{th}$ node, and using, by the p2p traffic optimization server, the multidimensional vector as a peer identifier of the node.

2. The method according to claim 1, wherein the nodes are autonomous system (AS) nodes, and allocating, by the p2p traffic optimization server, the generated network mapping identifier to the peer comprises:
    allocating, by the p2p traffic optimization server, a generated network mapping identifier of an AS node to peers comprised in the AS node; or
    the nodes are point of presence (POP) nodes, and allocating, by the p2p traffic optimization server, the generated network mapping identifier to the peer comprises:
    allocating, by the p2p traffic optimization server, a generated network mapping identifier of a POP node to the peers connected to the POP node; or
    the nodes are peers.

3. A device for processing a network mapping identifier, the device comprising:
    a processor; and
    a memory coupled to the processor comprising instructions that, when executed by the processor, cause the device to:
    obtain topology information of a network, wherein the topology information comprises a relation between nodes in the network;
    generate a network mapping identifier capable of indicating a relation between a peer and other peers in the network according to the topology information obtained by the first obtaining module; and
    allocate the generated network mapping identifier to the peer;
    wherein the device is configured to:
        generate a peer identifier capable of indicating a relation between each peer and other nodes in the network according to the topology information obtained, and use the peer identifier as the network mapping identifier; or
        generate a peer identifier capable of indicating a relation between each peer and other peers in the network according to the topology information obtained, generate an Internet Service Provider (ISP) identifier, and combine the ISP identifier and the peer identifier into the network mapping identifier;

wherein the device is further configured to:

obtain weight values between the nodes in the network according to the topology information to construct an n×n matrix Q, wherein n is the number of the nodes, $W_{ij}$ is an element in an $i^{th}$ row and a $j^{th}$ column in Q and is a weight value from an $i^{th}$ node to a $j^{th}$ node, and when i=j, $W_{ij}$ is a value greater than or smaller than all weight values between the nodes, $i,j \in [1,n]$;

decompose Q into Q1 and Q2, wherein a product of Q1 and Q2 is Q;

extract elements in an $i^{th}$ row in Q1, and use the elements in the $i^{th}$ row in Q1 to form a source part of a multi-dimensional vector of the $i^{th}$ node;

extract elements in an $i^{th}$ row in Q2, and use the elements in the $i^{th}$ row in Q2 to form a destination part of the multidimensional vector of the $i^{th}$ node; and combine the source part and the destination part into the multidimensional vector of the $i^{th}$ node, and use the multidimensional vector as a peer identifier of the node.

* * * * *